US012515916B2

(12) United States Patent
Li et al.

(10) Patent No.: US 12,515,916 B2
(45) Date of Patent: Jan. 6, 2026

(54) ELEVATOR CONTROL METHOD, APPARATUS, ELECTRONIC DEVICE, STORAGE MEDIUM AND SYSTEM

(71) Applicant: BAIDU ONLINE NETWORK TECHNOLOGY (BEIJING) CO., LTD., Beijing (CN)

(72) Inventors: Shiyu Li, Beijing (CN); Quan Wen, Beijing (CN); Haifeng Wang, Beijing (CN); Daoping Sun, Beijing (CN); Shun Zhang, Beijing (CN); Xiaogang Wang, Beijing (CN); Wenwen Liu, Beijing (CN); Yan Hong, Beijing (CN); Fei Long, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1500 days.

(21) Appl. No.: 17/036,772

(22) Filed: Sep. 29, 2020

(65) Prior Publication Data

US 2021/0276827 A1 Sep. 9, 2021

(30) Foreign Application Priority Data

Mar. 4, 2020 (CN) ........................ 202010144916.X

(51) Int. Cl.
*B66B 1/46* (2006.01)
*B66B 1/34* (2006.01)
*B66B 3/00* (2006.01)

(52) U.S. Cl.
CPC ............ *B66B 1/468* (2013.01); *B66B 1/3446* (2013.01); *B66B 3/002* (2013.01); *B66B 2201/4646* (2013.01)

(58) Field of Classification Search
CPC ....... B66B 1/468; B66B 1/3446; B66B 3/002; B66B 2201/4646
(Continued)

(56) References Cited

U.S. PATENT DOCUMENTS

2018/0053504 A1* 2/2018 Wang ...................... H04W 4/33
2020/0412570 A1* 12/2020 Takeda .................... G10L 15/30

FOREIGN PATENT DOCUMENTS

CN 106395516 A 2/2017
CN 107758457 A 3/2018
CN 109704161 A 5/2019
CN 110002290 A 7/2019
(Continued)

OTHER PUBLICATIONS

Office Action for corresponding Japanese patent application No. 2020-209381 dated Dec. 21, 2021, seven pages.
(Continued)

*Primary Examiner* — Kawing Chan

(57) ABSTRACT

The present disclosure provides an elevator control method, apparatus, electronic device, storage medium and system, which relate to artificial intelligence technology. The method includes: obtaining a user instruction, where the user instruction is determined by a speech device based on a user's speech content; recognizing the user instruction and converting the user instruction into an elevator control instruction; and controlling an elevator via the elevator control instruction. The elevator control method provided by the present disclosure enables the user to control the elevator through the speech device without touching the elevator, and thereby reducing potential safety risk caused by multiple people touching the elevator.

17 Claims, 13 Drawing Sheets

(58) Field of Classification Search
USPC .......................................................... 187/380
See application file for complete search history.

(56) References Cited

FOREIGN PATENT DOCUMENTS

| | | | | | |
|---|---|---|---|---|---|
| CN | 110422710 | A | | 11/2019 | |
| CN | 114873394 | A | * | 8/2022 | |
| CN | 115557339 | A | * | 1/2023 | ............... B66B 1/14 |
| JP | S571172 | A | | 1/1982 | |
| JP | 2011144034 | A | | 7/2011 | |
| JP | 2014172714 | A | | 9/2014 | |
| JP | 2017001801 | A | | 1/2017 | |
| WO | 2018072319 | A1 | | 4/2018 | |
| WO | 2018142603 | A1 | | 8/2018 | |
| WO | 2019202666 | A1 | | 10/2019 | |

OTHER PUBLICATIONS

Office Action in corresponding Chinese Patent Application No. 202010144916.X dated Nov. 8, 2022.
Deng, Kaifa et al., "Artificial Intelligence and Art Design", East China University of Science and Technology Press, Sep. 2019.
Yang, Junye, "Small Maker 3D Printing Multi-Guide", Science and Technology of China Press, Aug. 2019.
Office Action for corresponding Japanese patent application No. 2020-209381 dated Apr. 15, 2022, thirteen pages.
First Office Action of priority Chinese application No. 202010144916.X dated Oct. 27, 2021, 16 pages.
Lin, Qilin et al.: "Design of Elevator Assistant Control System Based on Speech Recognition," Computer & Digital Engineering, vol. 45, No. 3, Mar. 29, 2017, pp. 544-548.

* cited by examiner

ELEVATOR CONTROL METHOD, APPARATUS, ELECTRONIC DEVICE, STORAGE MEDIUM AND SYSTEM

CROSS-REFERENCE TO RELATED APPLICATION

This application claims priority to Chinese Patent Application No. 202010144916.X, filed on Mar. 4, 2020, which is hereby incorporated by reference in its entirety.

TECHNICAL FIELD

The present disclosure relates to communication technology and particularly, to artificial intelligence technology.

BACKGROUND

At present, with the development of artificial intelligence technology, artificial intelligence technology is applied in various scenarios, such as an elevator control scenario.

In the prior art, there exists a radio frequency identification-based elevator control, by which the control of elevator can be realized through swiping card, and also exists an elevator control realized by mean of facial recognition.

However, these methods require a user to touch the elevator for controlling it. As an example, pressing the button for the floor that the user wants to reach is required. Due to a large number of people using the elevator, this method poses a potential safety risk and, especially during a period of infectious disease outbreak, this method is likely to cause the spread of epidemic.

Therefore, how to enable users to control the elevator completely without touch, so as to improve the safety in the process of using the elevator, is a problem need to be urgently solved by those skilled in the art.

SUMMARY

The present disclosure provides an elevator control method, apparatus, electronic device, storage medium and system to realize a non-contact elevator control.

In a first aspect, the present disclosure provides an elevator control method, including:

obtaining a user instruction, where the user instruction is determined by a speech device based on a user's speech content;

recognizing the user instruction and converting the user instruction into an elevator control instruction; and controlling an elevator via the elevator control instruction.

In an embodiment, the controlling the elevator via the elevator control instruction includes:

sending the elevator control instruction to an elevator control cloud, so as to enable the elevator control cloud to control the elevator according to the elevator control instruction.

In this embodiment, the elevator can be controlled by the elevator control cloud, thereby reducing the design complexity of the control logic of the elevator itself.

In an embodiment, the controlling the elevator via the elevator control instruction, includes:

sending the elevator control instruction to the elevator, so as to enable the elevator to execute the elevator control instruction.

In this embodiment, the elevator can be directly controlled, thereby reducing devices in communication intermediate links and reducing interaction links, and improving the elevator control efficiency.

In an embodiment, an elevator control protocol is preset; the converting the user instruction into an elevator control instruction, includes:

converting the user instruction into the elevator control instruction based on the elevator control protocol.

In an embodiment, when the user instruction is a reservation instruction, the method further includes:

recognizing time information included in the reservation instruction; and determining timing of sending the elevator control instruction according to the time information.

In this embodiment, the timing for sending the elevator control instruction may be determined on a cloud side of the speech device, and thus a logic associated with controlling the timing of elevator operation designed on the elevator side is not necessary, thereby reducing improvement complexity of the elevator side.

In an embodiment, the method further includes:

receiving the elevator control information, and sending an elevator control result to the speech device according to the elevator control information, so as to enable the speech device to broadcast a notification message according to the elevator control result.

In this embodiment, an elevator control may be implemented indoors or in other areas, thereby avoiding people gathering caused by multiple people waiting for the elevator, and further improving the safety of using the elevator.

In an embodiment, the method further includes: receiving elevator control information, and broadcasting a notification message according to the elevator control information.

In an embodiment, when the method is performed by a speech device, a notification message can be directly broadcasted by the speech device, so as to notify the user of an elevator state.

In an embodiment, before the obtaining a user instruction, the method further includes:

receiving address information sent by the speech device; and sending the address information and information of the speech device to the elevator control cloud, so as to enable the elevator control cloud to determine a corresponding relationship between the speech device and the elevator according to the address information.

In an embodiment, the elevator control instruction includes the information of the speech device, so as to enable the elevator control cloud to determine an elevator to be controlled according to the corresponding relationship between the speech device and the elevator and the information of the speech device.

In an embodiment, before the obtaining a user instruction, the method further includes:

receiving address information and/or elevator information; and determining a corresponding relationship between the speech device and the elevator according to the address information and/or the elevator information; and where the sending the elevator control instruction to the elevator, includes;

determining an elevator to be controlled according to the corresponding relationship between the speech device and the elevator, and sending the elevator control instruction to the elevator to be controlled.

In this embodiment, the relationship between the speech device and the elevator may be bound in advance based on user's setting, and thus the elevator that can be controlled by the speech device can be determined based on the relationship.

In an embodiment, a disposing position of the speech device includes any one of the following:

indoor, in a floor where the elevator is disposed, and inside the elevator.

In an embodiment, the method includes:

presetting an instruction dictionary for controlling the elevator, and training the speech device according to the instruction dictionary.

In this embodiment, the speech device is capable of recognizing an elevator related instruction through training, and thus a non-contact control of an elevator can be realized through a speech device.

In a second aspect, the present disclosure provides an elevator control method, including:

- receiving a speech content from a user, and determining an user instruction according to the speech content; and
- sending the user instruction to a speech device cloud, so as to enable the speech device cloud to recognize the user instruction and control an elevator according to a recognition result.

In a third aspect, the present disclosure provides an elevator control method, including:

- receiving an elevator control instruction sent by a speech device cloud, where the elevator control instruction is obtained by the speech device cloud through recognizing a received user instruction; and
- controlling an elevator according to the elevator control instruction.

In a fourth aspect, the disclosure provides an elevator control apparatus, including:

- an obtaining module, configured to obtain a user instruction, where the user instruction is determined by a speech device based on a user speech content;
- a recognition module, configured to recognize the user instruction, and convert the user instruction into an elevator control instruction; and
- a control module, configured to control an elevator via the elevator control instruction.

In a fifth module, the disclosure provides an elevator control apparatus, including:

- a receiving module, configured to receive a speech content from a user and determine a user instruction based on the speech content; and
- a sending module, configured to send the user instruction to a speech device cloud, so as to enable the speech device cloud to recognize the user instruction and control an elevator according to a recognition result.

In a sixth module, the disclosure provides an elevator control apparatus, including:

- a receiving module, configured to receive an elevator control instruction sent by a speech device cloud, where the elevator control instruction is obtained by the speech device cloud through recognizing a received user instruction; and
- a control module, configured to control an elevator according to the elevator control instruction.

In a seventh module, the disclosure provides an electronic device, including:

- at least one processor; and
- a memory communicated with the at least one processor; where,
- the memory stores an instruction executable by the at least one processor, the instruction is executed by the at least one processor to enable the at least one processor to execute any one of elevator control method described in the first aspect to the third aspect.

In an eighth aspect, the present disclosure provides a non-instantaneous computer readable storage medium storing a computer instruction, where, the computer instruction is configured to enable a computer to execute any one of the methods described in the first aspect to the third aspect.

In a ninth aspect, the present disclosure provides an elevator control system, including a speech device, a speech device cloud, an elevator control cloud and an elevator; where,

- the speech device is connected with the speech device cloud, the speech device cloud is connected with the elevator control cloud, and the elevator control cloud is connected with the elevator;
- the speech device is configured to execute the elevator control method described in the second aspect;
- the speech device cloud is configured to execute any one of the elevator control methods described in the first aspect; and
- the elevator control cloud is configured to execute the elevator control method in the third aspect, realizing the control of the elevator.

The present disclosure provides the elevator control method, apparatus, electronic device, storage medium and system, where, the method includes: obtaining a user instruction, where the instruction is determined based on a user speech content; recognizing the user instruction, and converting the user instruction into an elevator control instruction; and controlling an elevator via the elevator control instruction. The elevator control method provided by the present disclosure enables the user to control an elevator through a speech device without touching the elevator, thereby reducing potential safety risk caused by multiple people touching the elevator.

BRIEF DESCRIPTION OF DRAWINGS

The accompanying drawings are used for a better understanding of the solution, but not construed as limiting this disclosure, where.

DESCRIPTION OF EMBODIMENTS

Exemplary embodiments of the present disclosure are illustrated below in combination with the accompanying drawings, where various details of the embodiments of the present disclosure are included for understanding, which should be considered as merely exemplary. Therefore, those skilled in the art should recognize that various alterations and modifications may be made to the embodiments described herein, without departing from the scope and spirit of the present disclosure. Likewise, for clarity and conciseness, descriptions of well-known functions and structures are omitted in the following description.

In the existing elevator use scenarios, both an intelligent elevator and a traditional elevator require a user to touch the elevator for controlling the elevator. For example, the elevator requires the user to press a floor button. When there are a large number of people using the elevator, multiple people would touch the same spot of the elevator, which might result in a safety risk. Especially when a user of the elevator carries an infectious disease, this way of using the elevator is likely to cause the spread of disease and poses a potential safety risk. In addition, a potential sanitary risk also exists when multiple people touch the same spot of the elevator.

In order to solve the abovementioned technical problems, the present disclosure provides an elevator control solution according to which the elevator is controlled by a speech device, and thus the elevator can be controlled without touch, thereby solving the problem of potential safety risk caused by touch-based elevator control in the prior art.

Figure 1A:
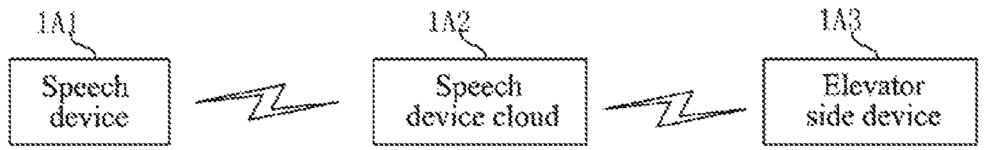
FIG. 1A is a system architecture diagram illustrated in an exemplary embodiment of the present disclosure.

FIG. 1A is a system architecture diagram illustrated in an exemplary embodiment of the present disclosure.

As shown in FIG. 1A, solutions provided by the present disclosure may be applied to the system illustrated in FIG. 1A. The system may include a speech device 1A1, a speech device cloud 1A2 and an elevator side device 1A3.

The speech device 1A1 may interact with the speech device cloud 1A2 through a network, for example, a user may send an instruction to the speech device 1A1, the speech device 1A1 may send a control instruction to the speech device cloud 1A2 based on the user instruction, and then the speech device cloud 1A2 sends an instruction to the elevator side device 1A3 according to the control instruction, so as to control the elevator.

When the speech device 1A1 is disposed indoors, the user may remotely control the elevator, for example, call the elevator to reach the floor where the user currently located. When the speech device 1A1 is disposed on a floor, the user may control the elevator on the floor, for example, call the elevator to reach the floor where the user currently located and open the elevator door. When the speech device 1A1 is disposed inside the elevator, the user may control the elevator in the elevator, for example, send out a destination floor to be reached.

Figure 1B:
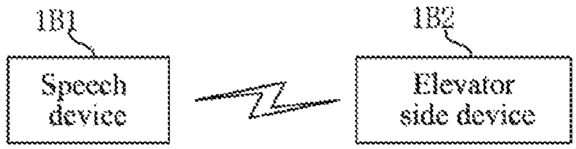
FIG. 1B is a system architecture diagram illustrated in another exemplary embodiment of the present disclosure.

FIG. 1B is a system architecture diagram illustrated in another exemplary embodiment of the present disclosure.

As shown in FIG. 1B, the solutions provided by the present disclosure may be applied to the system illustrated in FIG. 1B. The system may include a speech device 1B1 and an elevator side device 1B2.

The speech device 1B1 may be connected with the elevator side device 1B2 in a wired or wireless manner. For example, the speech device 1B1 may be connected with the elevator side device 1B2 through an internal network; for another example, the speech device 1B1 may be integrated in an elevator, and disposed with the elevator as a whole.

For example, a user may send an instruction to the speech device 1B1, and then the speech device 1B1 may send a control instruction to the elevator side device 1B2, so as to control the elevator.

When the speech device 1B1 is disposed indoors, the user may remotely control the elevator, for example, call the elevator to reach the floor where the user currently located. When the speech device 1B1 is disposed on a floor, the user may control the elevator on the floor, for example, call the elevator to reach the floor where the user currently located and open the elevator door. When the speech device 1B1 is disposed inside the elevator, the user may control the elevator in the elevator, for example, send out a destination floor to be reached.

The speech device may be in a form of a speaker, or a control apparatus disposed indoors, such as a control apparatus used to open a unit door, or a processing module integrated in an elevator, etc.

Figure 2:
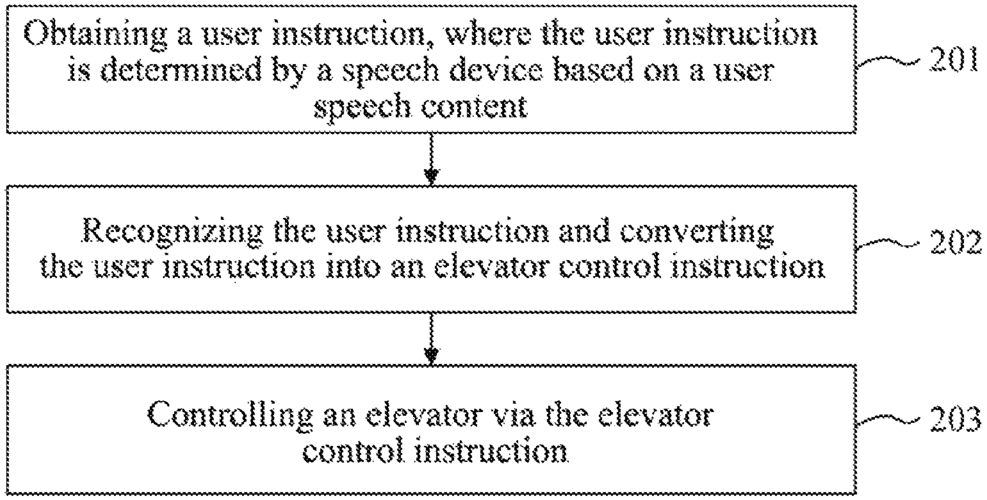
FIG. 2 is a flowchart of an elevator control method illustrated in the first exemplary embodiment of the present disclosure.

FIG. 2 is a flowchart of an elevator control method illustrated in the first exemplary embodiment of the present disclosure.

As shown in FIG. 2, an elevator control method provided by the present disclosure includes:

Step 201, obtaining a user instruction, where the user instruction is determined by a speech device based on a user speech content.

The method provided by the present embodiment may be performed by an electronic device with a computing capability, where the electronic device may be, for example, the speech device cloud 1A2 shown in FIG. 1A. The speech device cloud 1A2 may be a single electronic device, or may be composed of multiple electronic devices, for example, may be a distributed cluster server. The specific form thereof may be one or several computers.

In an implementation, the electronic device for performing the method provided by the present embodiment may also be the speech device 1B1 shown in FIG. 1B, where the speech device 1B1 can recognize the speech content spoken by the user and control the elevator based on a recognition result.

Specifically, the user may speak a speech content, and the speech device can recognize the speech content and determine a user instruction.

Further, the speech device may obtain the user instruction by converting the speech content into a text content. A semantic recognition algorithm may be preset in the speech device, so as to convert the speech content spoken by the user into the text content.

Figure 3A:
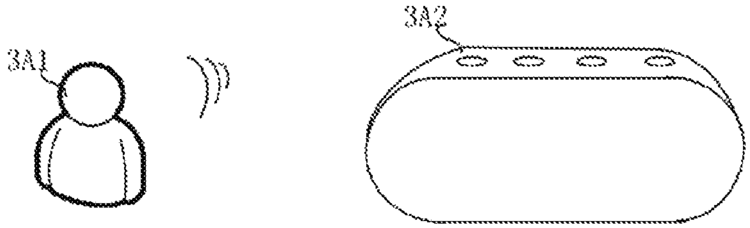
FIG. 3A is a diagram of a first application scenario illustrated in an exemplary embodiment of the present disclosure.

FIG. 3A is a diagram of a first application scenario illustrated in an exemplary embodiment of the present disclosure.

As shown in FIG. 3, a user 3A1 may wake up a speech device 3A2 and speak a speech content to it. For example, the user may wake up the speech device 3A2 via an instruction, "xiaodu xiaodu", and thereafter, the user 3A1 may speak a speech content, "I'm going to the 8th floor". The speech device 3A2 can convert this speech content into a text content, "I'm going to the 8th floor".

In practical applications, the speech device may be connected with a speech device cloud and, specifically, may be connected in a wired or wireless manner. For example, the user can configure a network for speech device, to enable the speech device to access the internet and then connect with the speech device cloud that also accesses the internet.

The speech device may send the recognized user instruction to the speech device cloud, so as to enable the speech device cloud to obtain the user instruction.

Specifically, when sending the user instruction, the speech device may encapsulate the user instruction in a message. The message may also include information related to the speech device, such as a speech device identification, or a user identification bound to the speech device.

Figure 3B:
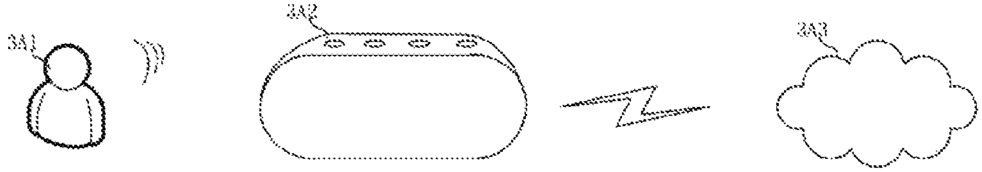
FIG. 3B is a diagram of a second application scenario illustrated in an exemplary embodiment of the present disclosure.

FIG. 3B is a diagram of a second application scenario illustrated in an exemplary embodiment of the present disclosure.

As shown in FIG. 3B, the speech device 3A2 may send the user instruction to the speech device cloud 3A3 after recognizing the user instruction, so as to enable the speech device cloud 3A3 to control the elevator based on the user instruction.

Figure 4:
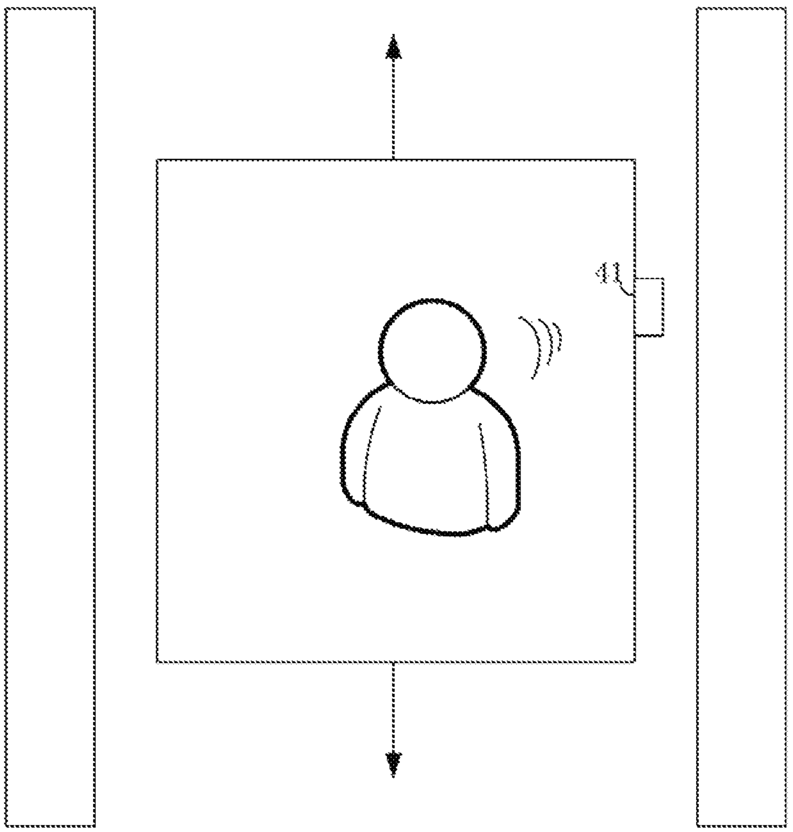
FIG. 4 is a diagram of a third application scenario illustrated in an exemplary embodiment of the present disclosure.

FIG. 4 is a diagram of a third application scenario illustrated in an exemplary embodiment of the present disclosure.

As shown in FIG. 4, the speech device 41 may be disposed in the elevator, for example, integrated in the elevator. The user can speak a speech content, "I'm going to the 8th floor". The speech device 41 can convert this speech content into a text content, "I'm going to the 8th floor", so as to obtain a user instruction matched with the speech content spoken by the user.

Step 202, recognizing the user instruction and converting the user instruction into an elevator control instruction.

Further, the user instruction may be recognized and, specifically, an intention of the instruction may be recognized. When the user instruction is an instruction related to elevator control, the elevator may be controlled according to a recognition result.

In practical applications, a recognition algorithm may be provided in advance, so as to recognize the user instruction and determine a user intention, thereby obtaining a recognition result. For example, when the user instruction is "I'm going to the 8th floor", the intention of the user is that he/she wants to go to the 8th floor, and thus the recognition result is correspondingly "going to the 8th floor".

When the method provided by the present embodiment is performed by the speech device cloud, the user instruction may be recognized by the speech device cloud; when the method provided by the present embodiment is performed by the speech device, the user instruction may be recognized by the speech device, so as to determine the user intention. For example, when the user instruction is "I'm going to the garage", the speech device cloud or the speech device can recognize the user intention as "going to the garage".

As the user instruction is obtained based on the speech content from the user, the standard of user instructions may not be uniform. For example, to go to the garage, some users may say "I'm going to drive in a while", and some user may say "I'm going to the garage". Therefore, a user intention may be recognized first, and then the user instruction is converted into an elevator control instruction based on the intention.

Further, an elevator control protocol may be preset in the speech device cloud or the speech device, and the elevator control protocol may be used to convert a user instruction into an elevator control instruction according to the user intention. For example, when the user instruction is "I'm going to drive in a while", the intention is recognized as "going to garage", and then an elevator control instruction obtained through conversion may include information of going to the garage.

When the method provided by the present embodiment is performed by the speech device cloud, the elevator control instruction may also include information of the speech device that sends the user instruction.

Step 203, controlling an elevator via the elevator control instruction.

In practical applications, the speech device cloud or the speech device may control an elevator according to the elevator control instruction obtained through conversion, which will be explained separately below according to different situations.

In an embodiment, an elevator control cloud may be disposed on the elevator device side, and the speech device cloud may obtain an elevator control instruction according to the recognition result and send the elevator control instruction to the elevator control cloud. Then the elevator control cloud sends a control instruction to the elevator, so as to realize a non-contact control of the elevator.

In another embodiment, the speech device cloud may obtain an elevator control instruction according to the recognition result, and then send the elevator control instruction directly to the elevator, so as to realize a non-contact control of the elevator.

In another further embodiment, the speech device cloud may convert the user instruction to obtain an elevator control instruction, and then send the elevator control instruction directly to the elevator, so as to realize a non-contact control of the elevator.

Specifically, the elevator may access a network in a wired or wireless manner, and thus the elevator is connected with the elevator control cloud, or the elevator is connected with the speech device cloud. The elevator may also be connected with the speech device in a wired manner, for example, the speech device may be integrated in the elevator.

Further, when the speech device is disposed in user's home, office or the like, then the speech device may also be preset to determine a floor where the speech device is located. For example, when the speech device is used by the user at home, the user may set the speech device, specifically, may set detailed address information, and the speech device may send this information to the speech device cloud.

When the speech device is disposed in a floor, then the floor where the speech device is located may be set by a vendor who set the speech device, and an elevator bound to the speech device may also be configured. When the speech device is disposed inside the elevator, a floor where the speech device is located may be associated with a floor where the elevator is located, and the elevator may also be bound with the speech device.

In an implementation, when the speech device cloud performs the method of the present embodiment, the speech device cloud may also determine address information of the speech device according to a network accessed by the speech device. For example, determine the corresponding actual address according to a network address of the accessed network.

In an embodiment, the speech device cloud may send the address information of the speech device to the elevator control cloud, or the speech device cloud may determine the corresponding elevator according to the address information, and then send a corresponding relationship between the speech device and the elevator to the elevator control cloud. The elevator control cloud may record the corresponding relationship between the speech device and the elevator. The speech device cloud may also determine a floor where the speech device is located according to the address information and send information of the floor to the elevator control cloud, or, the elevator control cloud may determine a floor where the speech device is located according to the received address information. In this embodiment, the elevator control cloud may record information of the elevator corresponding to the speech device, and may also record information of the floor where the speech device is located.

In another embodiment, the speech device cloud may store the address information of the speech device, or may determine the corresponding elevator according to the address information and store a corresponding relationship between the speech device and the elevator. A floor where the speech device is located may also be determined according to the address information. In this embodiment, the speech device cloud may record information of the elevator corresponding to the speech device, and may also record information of the floor where the speech device is located.

In still another embodiment, the speech device may be directly bound with an elevator to be controlled, for example, the speech device may send an elevator control instruction to a fixed elevator in a wired manner.

When controlling the elevator, when the elevator is controlled by the elevator control cloud, the speech device cloud or the elevator control cloud may determine an elevator be to controlled according to the corresponding relationship between the speech device and the elevator, and then the elevator control cloud send an instruction to the elevator to be controlled, so as to realize a non-contact control of the elevator. When the elevator is controlled directly by the speech device cloud, the speech device cloud may determine an elevator to be controlled according to the corresponding relationship between the speech device and the elevator, and directly send an instruction to the elevator to be controlled, so as to realize a non-contact control of the elevator.

The method provided by the present embodiment is used to control the elevator, and the method is performed by a device provided with the method provided by the present embodiment, where the device is generally implemented in a hardware and/or software manner.

The elevator control method provided by the present embodiment includes: obtaining a user instruction, where the user instruction is determined by a speech device based on a user speech content; recognizing the user instruction and converting the user instruction into an elevator control instruction; and controlling an elevator via the elevator control instruction. The elevator control method provided by the present embodiment enables the user to control an elevator through a speech device without touching the elevator, thereby reducing potential safety risk caused by multiple people touching the elevator.

Figure 5:
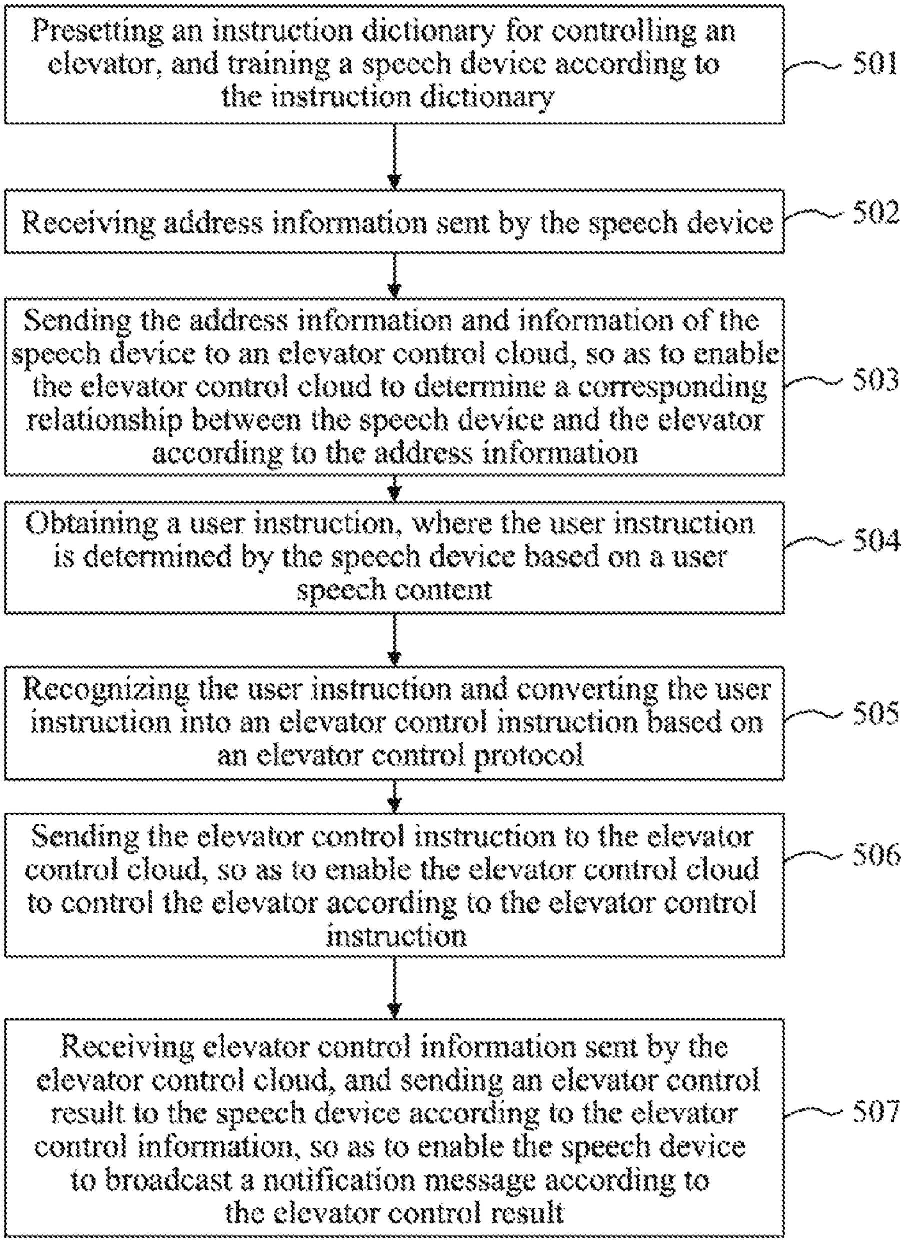
FIG. 5 is a flowchart of an elevator control method illustrated in the second exemplary embodiment of the present disclosure.

FIG. 5 is a flowchart of an elevator control method illustrated in the second exemplary embodiment of the present disclosure;

As shown in FIG. 5, an elevator control method provided by the present embodiment includes:

Step 501, presetting an instruction dictionary for controlling an elevator, and training a speech device according to the instruction dictionary.

The method provided by the present embodiment may be performed by an electronic device with a computing capability, where the electronic device may be, for example, the speech device cloud 1A2 shown in FIG. 1A. The speech device cloud 1A2 may be a single electronic device, or may be composed of multiple electronic devices, for example, may be a distributed cluster server. The specific form thereof may be one or several computers.

Specifically, an instruction dictionary may be preset, and the instruction dictionary includes instructions related to the elevator control. For example, "I'm going to the 8th floor", "I'm going to the garage", and for another example, "I'm going out in 5 minutes". These instructions may be used to train the speech device and, specifically, to train a built-in semantic recognition algorithm of the speech device, so as to enable the speech device to recognize the corresponding content after the user speaks a corresponding sentence.

Step 502, receiving address information sent by the speech device.

In that case, the method provided by the present embodiment may be performed by an electronic device with a computing capability, where the electronic device may be, for example, the speech device cloud 1A2 shown in FIG. 1A. The speech device cloud 1A2 may be a single electronic device, or may be composed of multiple electronic devices, for example, may be a distributed cluster server. The specific form thereof may be one or several computers.

Specifically, in the method provided by the present embodiment, the speech device may also be preset. For example, when the speech device is a user's device, then the user may set a home address, so as to enable the speech device to obtain address information.

Further, the speech device may send the address information to the speech device cloud through a network, so as to enable the speech device cloud to receive the address information.

Step 503, sending the address information and information of the speech device to an elevator control cloud, so as to enable the elevator control cloud to determine a corresponding relationship between the speech device and the elevator according to the address information.

In an embodiment, the elevator corresponding to the speech device may also be set directly. For example, when the speech device is configured on a floor or in an elevator, a staff may directly set the elevator controlled by the speech device. The speech device may send this information to the speech device cloud, and then the speech device cloud sent it to the elevator control cloud, and then the information is maintained by the elevator cloud.

Figure 6:
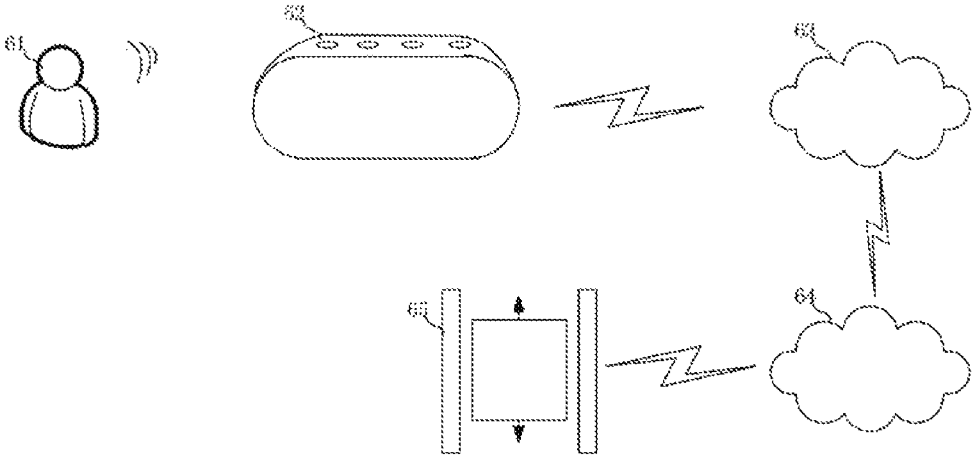
FIG. 6 is a diagram of a fourth application scenario illustrated in an exemplary embodiment of the present disclosure.

FIG. 6 is a diagram of a fourth application scenario illustrated in an exemplary embodiment of the present disclosure.

As shown in FIG. 6, the method provided by the present embodiment may be applied in the application scenario shown in FIG. 6.

A user 61 may interact with a speech device 62, the speech device 62 may interact with a speech device cloud 63 through a network, and the speech device cloud 63 interact with an elevator control cloud 64 through a network, and the elevator control cloud 64 can control the elevator 65.

Specifically, after receiving the address information, the speech device cloud may send information of the speech device which sends the address information and the address information together to an elevator control cloud. For example, a speech device A sends configuration information to an speech device cloud, where the information includes an address being Address1, and the sent information may also include sending source information, i.e., information of the speech device A, and then the speech device cloud may send the information of the speech device A and an address, Address1, to the elevator control cloud.

Further, the information of the speech device A may be an identification of the speech device A, or may be account information for logging into the speech device A, to which the present embodiment defines no limitations.

In practical applications, after receiving the information of the speech device and its associated address information, the elevator control cloud may determine the elevator corresponding to the speech device, i.e., an elevator that the speech device needs to control, according to the address information.

The elevator control cloud may also record the corresponding relationship between the speech device and the elevator, for example, the elevator control cloud may maintain a mapping table including information of each speech device and the elevator it controls, such as a corresponding relationship between a speech device identification and an elevator identification.

Specifically, the elevator control cloud may also determine floor information of the speech device according to the received address information and record the corresponding relationship between the speech device and the floor. For example, a mapping table, in which a corresponding relationship between the speech device identification and the floor is recorded, may be maintained.

For example, address information of the speech device A is Address1, and the elevator corresponding to the address is elevator 1, where the corresponding elevator refers to an elevator used at the address where the speech device A is located. The speech device cloud may send the address information of the speech device A, Address1, to the elevator control cloud, and the elevator control cloud determines that the elevator corresponding to the speech device A is elevator 1 and stores a corresponding relationship between the speech device A and the elevator 1.

Step 504, obtaining a user instruction, where the user instruction is determined by the speech device based on a user speech content.

The implementation of the step 504 is similar to that of step 201, and is not repeated herein.

Step 505, recognizing the user instruction and converting the user instruction into an elevator control instruction based on an elevator control protocol.

Further, an elevator control protocol may be preset in the speech device cloud, and the elevator control protocol may be used to convert a user instruction into an elevator control instruction.

In practical applications, the user instruction may be semantically recognized to obtain a user intention. The user intention may include information of a floor that the user wants to go. For example, when a user instruction is "I'm going to the garage", given that the garage in the building where the user is located is in the 1st basement floor, then a user intention may be recognized as "going to the 1st basement floor".

After recognizing a user intention, the user instruction may be converted into an elevator control instruction based on the elevator control protocol. When converting, the elevator control protocol may be used to convert the user instruction into the elevator control instruction according to the user intention. In an embodiment, the elevator control instruction obtained through conversion may include information of the speech device, and may also include information of a target floor.

Step 506, sending the elevator control instruction to the elevator control cloud, so as to enable the elevator control cloud to control the elevator according to the elevator control instruction.

Continue referring to FIG. 6, as shown in FIG. 6, the speech device cloud 63 may be connected with the elevator control cloud 64 through a network. After determining the elevator control instruction, the speech device cloud may send it to the elevator control cloud. The elevator control cloud controls the elevator based on the elevator control instruction.

Specifically, the elevator control instruction includes the information of the speech device, for example, may include a speech device identification. The elevator control cloud can determine an elevator to be controlled according to the corresponding relationship between the speech device and the elevator and the information of the speech device. The corresponding relationship may be a corresponding relationship determined by the elevator control cloud by using the address information and the information of the speech device that are received in step 503.

For example, when identification information of the speech device included in the elevator control instruction is A, the elevator control cloud may search a pre-determined corresponding relationship to determine that the elevator corresponding to the speech device A is an elevator 1, thereby determining the elevator 1 as the elevator to be controlled.

Further, the elevator control cloud may control the elevator to be controlled according to the elevator control instruction. For example, the elevator control cloud may determine a self-owned instruction according to the elevator control instruction, and send the self-owned instruction to the elevator, so as to enable the elevator to execute the self-owned instruction.

The self-owned instruction may be an existing instruction configured to control the elevator. For example, when the user presses a floor button 1, a control instruction generated or obtained by an elevator controller based on the pressing operation may be the self-owned instruction. For another example, when the user in a floor presses an up button, a control instruction generated or obtained by an elevator controller based on the operation may be the self-owned instruction. A reconstruction workload in an elevator side can be reduced by this way, thereby improving the efficiency of implementing the elevator control method.

In an embodiment, the user instruction is a reservation instruction. The reservation instruction refers to an instruction used for elevator reservation. For example, when a user says "I'm going downstairs in five minutes", the corresponding user instruction is a reservation instruction.

When the speech device cloud recognizes a user instruction as a reservation instruction, before the speech device cloud sends the elevator control instruction to the elevator control cloud, the method may further include:

recognizing time information included in the reservation instruction; and determining timing of sending the elevator control instruction according to the time information.

If the speech device cloud recognizes a user instruction as a reservation instruction, the speech device may recognize the time information included in the reservation instruction, specifically, time information that the user needs to use the elevator. For example, a recognition result may be "in five minutes".

When the speech content spoken by the user is "I'm going downstairs at six thirty", then the intelligent cloud device may recognize the "six thirty" included in the instruction.

The speech device cloud may determine timing of sending the elevator control instruction according to the time information. For example, the elevator control instruction may be sent in five minutes. For another example, when a recognized content is an accurate time, and the time is expressed in a 12-hour format, then the speech device cloud may also determine the timing of sending the elevator control instruction according to current time and the time information included in the reservation instruction, for example, may determine to send the elevator control instruction at 18:30.

When the user instruction is a reservation instruction, the speech device cloud controls the timing of sending the elevator control instruction, and thus designing logics in the elevator control cloud to control timing of the elevator is not required, thereby reducing the design complexity of the elevator control cloud.

Step 507, receiving elevator control information sent by the elevator control cloud, and sending an elevator control result to the speech device according to the elevator control information, so as to enable the speech device to broadcast a notification message according to the elevator control result.

Continue referring to the FIG. 6, In the method provided by the present embodiment, the elevator 65 may also send an elevator state to the elevator control cloud, and the elevator control cloud 64 may determine elevator control information based on the elevator state, and send the elevator control information to the speech device cloud 63, the speech device cloud 63 send an elevator control result to the speech device 62 according to the elevator control information, and the speech device 62 broadcasts a notification message according to the elevator control result, so as to enable the user 61 to determine whether go out or not based on the notification message.

The elevator state may include a floor that the elevator currently reaches, a state whether the elevator door is opened or closed and the like.

The elevator control method provided by the present embodiment may further include a reverse data transmission process through which the speech device can be controlled to notify the user of the elevator state.

The implementation of controlling an elevator indoors or remotely can further improve safety of the elevator in use. For example, a user may reserve an elevator indoors though a speech device before going out, and thus avoids waiting in front of the elevator and saves user's time. In addition, when there are many users using the elevator, waiting at an elevator entrance will also cause people gathering, and when this happens during a period of infectious disease outbreak, the people gathering cause by waiting for the elevator will also accelerate the spread of the epidemic.

Figure 7:
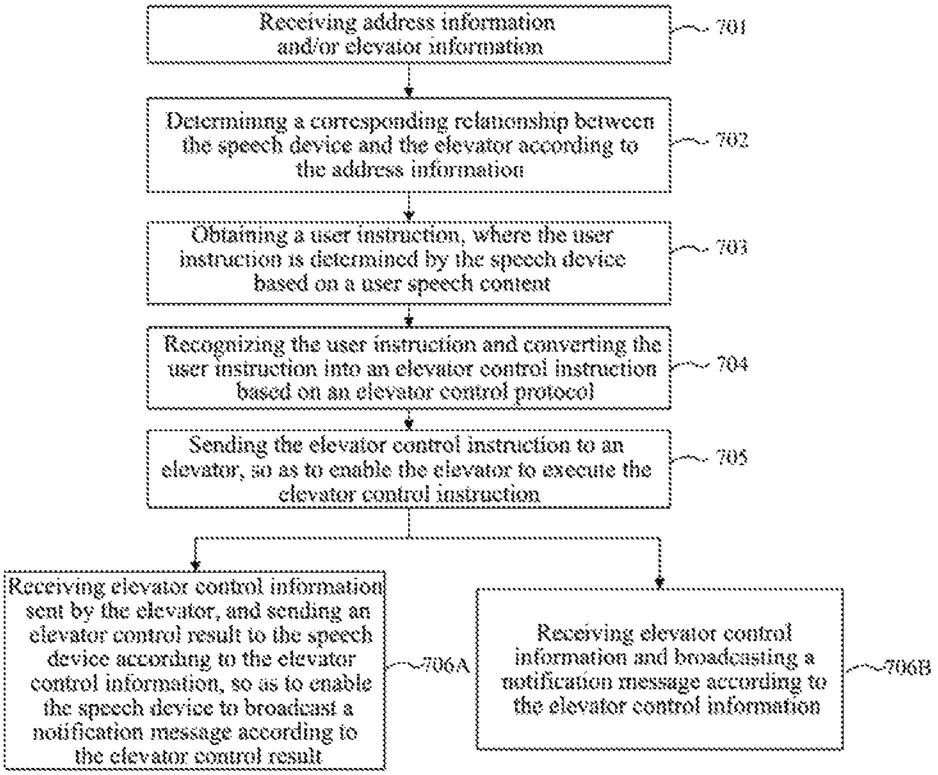
FIG. 7 is a flowchart of an elevator control method illustrated in the third exemplary embodiment of the present disclosure.

FIG. 7 is a flowchart of an elevator control method illustrated in the third exemplary embodiment of the present disclosure.

As shown in FIG. 7, the elevator control method provide by the present embodiment includes:

Step 701, receiving address information and/or elevator information.

Step 702, determining a corresponding relationship between the speech device and the elevator according to the address information.

In that case, the method provided by the present embodiment may be performed by an electronic device with a computing capability, where the electronic device may be, for example, the speech device cloud 1A2 shown in FIG. 1A. The speech device cloud 1A2 may be a single electronic device, or may be composed of multiple electronic devices, for example, may be a distributed cluster server. The specific form thereof may be one or several computers.

In an implementation, an electronic device for performing the method provided by the present embodiment may also be the speech device 1B1 shown in FIG. 1B, where the speech device 1B1 can recognize the user speech content and control the elevator based on a recognition result.

Specifically, in the method provided by the present embodiment, the speech device may also be preset. For example, when the speech device is a user's device, the user may set a home address, so as to enable the speech device to obtain address information. For another example, information of an elevator bound to the speech device may also be set by relevant staff.

In an embodiment, when the speech device cloud performs the method provided by the present embodiment, the user may set the speech device, and the speech device may send address information included in setting information to the speech device cloud through a network, so as to enable the speech device cloud to receive the address information.

In another embodiment, when the speech device performs the method provided by the present embodiment, information of an elevator bound to the speech device may be directly set, so as to enable the speech device to record information of the elevator it needs to control.

In practical applications, the speech device cloud may determine the elevator to be controlled according to the received address information and record a corresponding relationship between the speech device and the elevator. For example, the information of the speech device may be determined according to a received message containing address information, where the information may be a speech device identification, or an account for logging into the speech device, and the speech device cloud may record a corresponding relationship between the identification or the account and the elevator needs to be controlled.

In an embodiment, the elevator corresponding to the speech device may also be directly set. For example, when the speech device is disposed in a floor or in an elevator, the elevator controlled by the speech device may be directly set by a staff. The speech device may send this information to the speech device cloud, and send it to the elevator control cloud through the speech device cloud, and then the information is maintained by the elevator control cloud.

In an implementation, the speech device may also determine the corresponding relationship between itself and the elevator according to the received elevator information.

Figure 8:
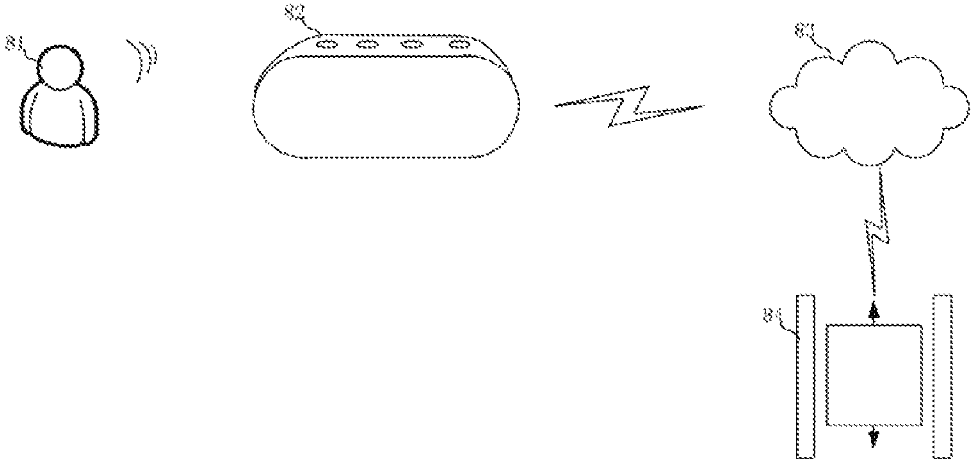
FIG. 8 is a diagram of a fifth application scenario illustrated in an exemplary embodiment of the present disclosure.

FIG. 8 is a diagram of a fifth application scenario illustrated in an exemplary embodiment of the present disclosure.

As shown in FIG. 8, the method provided by the present embodiment may be applied in the application scenario shown in FIG. 8.

A user 81 may interact with a speech device 82, the speech device 82 may interact with a speech device cloud 83 through a network, the speech device cloud 83 may interact with the elevator 84 through a network, and the speech device cloud 83 may directly control the elevator 84.

For example, a speech device B sends configuration information to the speech device cloud, where the information includes an address being Address2, and the sent information may also include sending source information, i.e. information of the speech device B.

Further, the information of the speech device B may be an identification of the speech device B, or may be an account information for logging into the speech device B, to which the present embodiment defines no limitations.

The speech device cloud may determine an elevator 2 as the elevator to be controlled according to the address of Address2, and record a corresponding relationship between the speech device B and the elevator 2.

For example, the speech device cloud may maintain a mapping table including information of each speech device and the elevator it controls, such as a corresponding relationship between a speech device identification and an elevator identification.

Specifically, the speech device cloud may also determine floor information of the speech device according to the received address information, and record the corresponding relationship between the speech device and the floor. For example, a mapping table, in which a corresponding relationship between the speech device identification and the floor is recorded, may be maintained.

Figure 9:
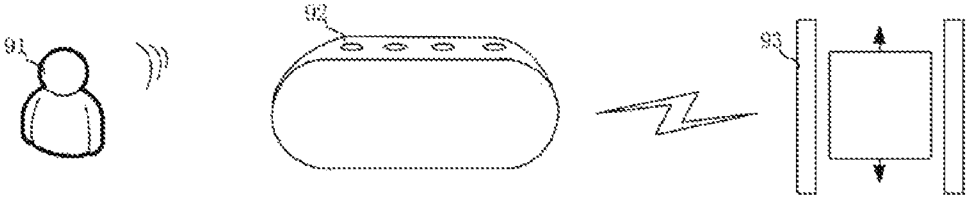
FIG. 9 is a diagram of a sixth application scenario illustrated in an exemplary embodiment of the present disclosure.

FIG. 9 is a diagram of a sixth application scenario illustrated in an exemplary embodiment of the present disclosure.

As shown in FIG. 9, the method provided in the present embodiment may also be applied in the application scenario shown in FIG. 9.

The user 91 may interact with a speech device 92, the speech device 92 may directly interact with an elevator 93 to realize control of the elevator 93.

The speech device 92 and the elevator 93 may be disposed as a whole, or disposed separately. When being disposed as a whole, the speech device 92 and the elevator 93 may be connected in a wired manner; when being disposed separately, the two may be connected in a wireless manner.

For example, when the elevator information received by the speech device indicates an elevator 3, the speech device may record the information that the elevator that it needs to control is the elevator 3.

Step 703, obtaining a user instruction, where the user instruction is determined by the speech device based on a user speech content.

The implementation of step 703 is similar to that of the step 201, and isn't repeated herein.

Step 704, recognizing the user instruction and converting the user instruction into an elevator control instruction based on an elevator control protocol.

Specific instruction conversion method is similar to that of the step 505, and isn't repeated herein.

In the present embodiment, the obtained elevator control instruction can be directly recognized by the elevator.

Step 705, sending the elevator control instruction to an elevator, so as to enable the elevator to execute the elevator control instruction.

Continue referring to FIG. 8, as shown in FIG. 8, the speech device cloud 83 and the elevator 84 may be connected through a network. After determining an elevator control instruction, the speech device cloud may directly send the elevator control instruction to an elevator, so as to realize a non-contact control of the elevator.

Referring to FIG. 9, as shown in FIG. 9, the speech device 92 and the elevator 93 may be connected in a wired or wireless manner. After determining an elevator control instruction, the speech device may directly send the elevator control instruction to an elevator, so as to realize a non-contact control of the elevator.

Specifically, an extension module may be disposed in the elevator to recognize the elevator control instruction, and control the elevator based on a recognition result.

Further, the speech device cloud or the speech device may determine an elevator to be controlled according to a corresponding relationship between the speech device and the elevator and the speech device that sends the user instruction. The corresponding relationship may be a corresponding relationship determined by the speech device cloud in steps 701 and 702.

For example, when identification information of the speech device that sends the user instruction is B, the speech device cloud may search a pre-determined corresponding relationship, and determine that the elevator corresponding to the speech device B is the elevator 2, thereby determining the elevator 2 as the elevator to be controlled.

In practical applications, the speech device cloud may send an elevator control instruction to the elevator to be controlled, so as to enable the elevator to be controlled executes the instruction.

For another example, when an elevator 3 is recorded as the elevator to be controlled in the speech device that obtains the user instruction, the speech device may directly send the elevator control instruction to the elevator 3.

In the method provided by the present embodiment, the elevator control instruction obtained through conversion may be a self-owned instruction of the elevator, where the elevator control protocol may be used to convert the user instruction to the self-owned instruction. The self-owned instruction may be an existing instruction configured to control the elevator. For example, when the user presses a floor button 1, a control instruction generated or obtained by an elevator controller based on the pressing operation may be the self-owned instruction. For another example, when the user in a floor presses an up button, a control instruction generated or obtained by an elevator controller based on the operation may be the self-owned instruction. A reconstruction workload of the elevator side can be reduced by this way, thereby improving the efficiency of implementing the elevator control method.

In an embodiment, the user instruction is a reservation instruction. The reservation instruction refers to an instruction used for elevator reservation. For example, when a user says "I'm going downstairs in five minutes", the corresponding user instruction is a reservation instruction.

When the speech device cloud recognizes a user instruction as a reservation instruction, before the speech device cloud sends the elevator control instruction to the elevator, the method may further include:

recognizing time information included in the reservation instruction; and determining timing of sending the elevator control instruction according to the time information.

When the speech device cloud recognizes a user instruction as a reservation instruction, the speech device may recognize the time information included in the reservation instruction, specifically, the time information that the user needs to use the elevator. For example, a recognition result may be "in five minutes".

When the speech content spoken by the user is "I'm going downstairs at six thirty", then the intelligent cloud device may recognize the "six thirty" included in the instruction.

The speech device cloud may determine timing of sending the elevator control instruction according to the time information. For example, the elevator control instruction may be sent in five minutes. For another example, when a recognized content is an accurate time, and the time is expressed in a 12-hour format, then the speech device cloud may also determine the timing of sending the elevator control instruction according to current time and the time information included in the reservation instruction, for example, may determine to send the elevator control instruction at 18:30.

When the user instruction is a reservation instruction, the speech device cloud or the speech device controls the timing of sending the elevator control instruction, and thus designing logics in the elevator control cloud to control timing of the elevator is not required, thereby reducing the design complexity of the elevator control cloud.

Step 706A, receiving elevator control information sent by the elevator, and sending an elevator control result to the speech device according to the elevator control information, so as to enable the speech device to broadcast a notification message according to the elevator control result.

Continue referring to the FIG. 8, in the method provided by the present embodiment, the elevator 84 may also send elevator control information to the speech device cloud 83, the speech device cloud 83 may determine an elevator control result based on the elevator control information and send the elevator control result to the speech device 82, and the speech device 82 broadcasts a notification message according to the elevator control result, so as to enable the user 81 to determine whether go out or not based on the notification message.

Step 706B, receiving elevator control information and broadcasting a notification message according to the elevator control information.

Continue referring to FIG. 9, in the method provided by the embodiment, the elevator 93 may also send elevator control information to the speech device 92, and the speech device 92 may broadcast a notification message based on the elevator control information, such as "first floor is arrived", so as to remind the user a floor arrived currently.

The elevator control method provided by the present embodiment may further include a reverse data transmission process through which the speech device can be controlled to notify the user of the elevator state.

This implementation of controlling an elevator indoors or remotely can further improve safety of the elevator in use. For example, a user may reserve an elevator indoors though a speech device before going out, and thus avoids waiting in front of the elevator and saves user's time. In addition, when there are many users using the elevator, waiting at an elevator entrance will also cause people gathering, and when this happens during a period of infectious disease outbreak, the people gathering cause by waiting for the elevator will also accelerate the spread of the epidemic.

Figure 10:
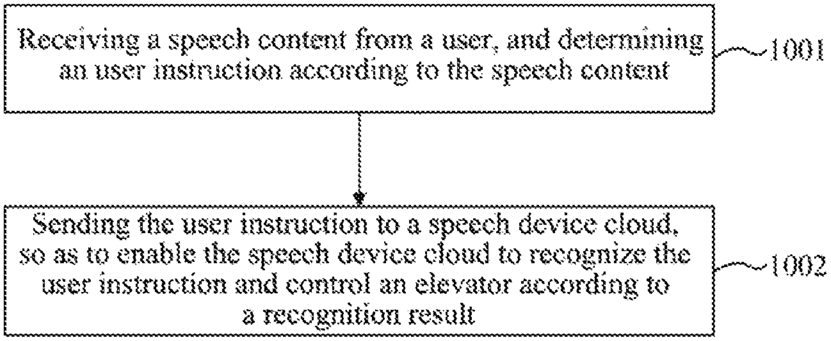
FIG. 10 is a flowchart of an elevator control method illustrated in the fourth exemplary embodiment of the present disclosure.

FIG. 10 is a flowchart of an elevator control method illustrated in the fourth exemplary embodiment of the present disclosure.

As shown in FIG. 10, the elevator control method provided by the present disclosure, includes:

Step 1001, receiving a speech content from a user, and determining a user instruction according to the speech content.

The method provided by the present embodiment may be performed by an electronic device with a computing capability, where the electronic device may be, for example, the speech device 1A1 shown in FIG. 1A. The speech device 1A1 may be an electronic device provided with a microphone.

Specifically, the speech device 1A1 may be in a form of, for example, a smart speaker, or a lighting lamp accessing a network.

Further, the user may speak the speech content, and a speech device may recognize the speech content, and determine a user instruction. Further, the speech device may obtain the user instruction by converting the speech content into a text content. A semantic recognition algorithm may be preset in the speech device, so as to convert the speech content spoken by the user into the text content.

For example, the user may wake up the speech device and speak a speech content to it. For example, the user may wake up the speech device by an instruction "xiaodu xiaodu", and thereafter, the user may speak a speech content, "I'm going to the 8th floor". The speech device can convert the speech content into a text content "I'm going to the 8th floor".

Step 1002, sending the user instruction to a speech device cloud, so as to enable the speech device cloud to recognize the user instruction and controls an elevator according to a recognition result.

In practical applications, the speech device may be connected with a speech device cloud, specifically, may be connected in a wired or wireless manner. For example, the user may configure a network for speech device, to enable the speech device to access the internet, and then connect with a speech device cloud that also accesses the internet.

The speech device may send the recognized user instruction to the speech device cloud.

Specifically, when sending the user instruction, the speech device may encapsulate the user instruction in a message. The message may also include information related to the speech device, such as a speech device identification, or a user identification bound to the speech device.

Further, the speech device cloud may recognize the user instruction, specifically, recognize an intention of the instruction. When the user instruction is an instruction related to the elevator control, the speech device cloud may control the elevator according to the recognition result.

In practical applications, a recognition algorithm may be provided in advance in the speech device cloud, so as to recognize the user instruction and determine a user intention, thereby obtaining the recognition result. The speech device cloud may control the elevator according to the recognition result.

In an embodiment, an elevator control cloud may be disposed at the elevator device side, the speech device cloud may send an elevator control instruction to the elevator control cloud according to the recognition result, and then the elevator control cloud sends a control instruction to the elevator, so as to realize the non-contact control of the elevator.

In another embodiment, the speech device cloud may directly send an elevator control instruction to the elevator according to the recognition result, so as to realize the non-contact control of the elevator.

Specifically, the elevator may access a network in a wired or wireless manner, so as to enable the elevator to be connected with the elevator control cloud, or enable the elevator to be connected with the speech device cloud.

The method provided by the present embodiment is used to control the elevator, and the method is performed by a device provided with the method provided by the present embodiment, the device is generally implemented in a hardware and/or software manner.

The elevator control method provided by the present embodiment includes: receiving a speech content from a user, and determining an user instruction according to the speech content; and sending the user instruction to a speech device cloud, so as to enable the speech device cloud to recognize the user instruction and control an elevator according to a recognition result. The elevator control method provided by the present embodiment enables the user to control an elevator through a speech device without touching the elevator, thereby reducing the potential safety risk caused by multiple people touching the elevator.

Figure 11:
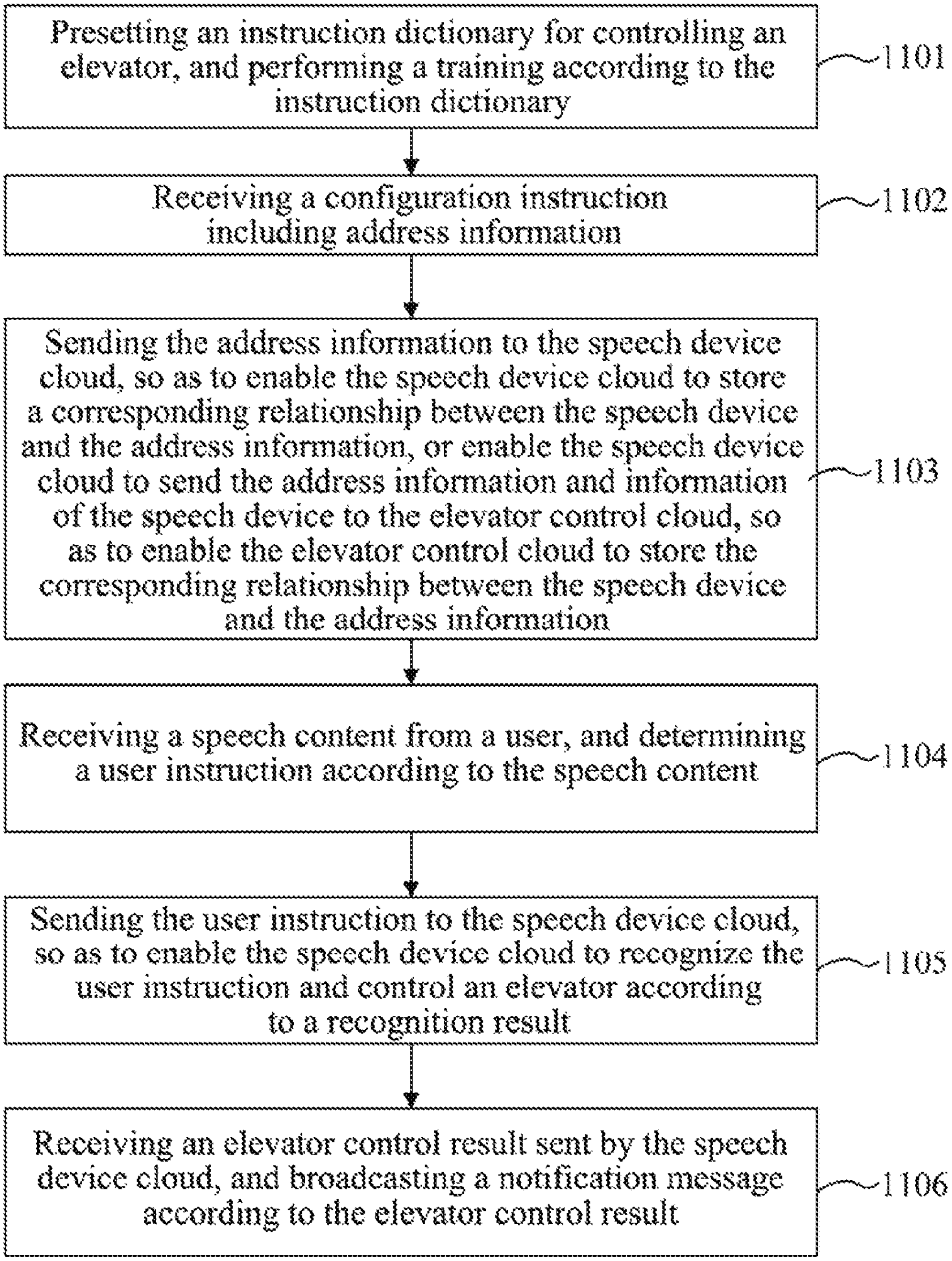
FIG. 11 is a flowchart of an elevator control method illustrated in the fifth exemplary embodiment of the present disclosure.

FIG. 11 is a flowchart of an elevator control method illustrated in the fifth exemplary embodiment of the present disclosure.

As shown in FIG. 11, an elevator control method provided by the present disclosure includes:

Step 1101, presetting an instruction dictionary for controlling an elevator, and performing a training according to the instruction dictionary.

The method provided by the present embodiment may be performed by an electronic device with a computing capability, where the electronic device may be, for example, the speech device 1A1 shown in FIG. 1A. The speech device 1A1 may be an electronic device provided with a microphone.

Specifically, the speech device 1A1 may be in a form of, for example, a smart speaker, or a lighting lamp accessing the network.

Specifically, an instruction dictionary may be preset, where the instruction dictionary includes instructions related to the elevator control. For example, "I'm going to the 8th floor", "I'm going to the garage", and for another example, "I'm going out in 5 minutes". These instructions may be used to train the speech device, specifically, to train a built-in semantic recognition algorithm of the speech device, so as to enable the speech device to recognize the corresponding content after the user speaks a corresponding sentence.

Step 1102, receiving a configuration instruction including address information.

In the method provided by the present embodiment, the speech device may also be preset. For example, when the speech device is a user's device, then the user may set a home address, so as to enable the speech device to obtain address information.

Further, the speech device may send the address information to the speech device cloud through a network, so as to enable the speech device cloud to receive the address information.

Step 1103, sending the address information to the speech device cloud, so as to enable the speech device cloud to store a corresponding relationship between the speech device and the address information, or, to enable the speech device cloud to send the address information and information of the speech device to an elevator control cloud, and thus enable the elevator control cloud to store the corresponding relationship between the speech device and the address information.

An execution sequence of step 1101 and steps 1102-1103 is not limited.

The speech device may send the address information to the speech device cloud.

In an embodiment, the speech device cloud may send the address information of the speech device to the elevator control cloud, or the speech device cloud determines the corresponding elevator according to the address information, and then sends a corresponding relationship between the speech device and the elevator to the elevator control cloud. A corresponding relationship between the speech device and the elevator may be recorded by the elevator control cloud.

In another embodiment, the speech device cloud may store the address information of the speech device, or determine the corresponding elevator according to the address information and store a corresponding relationship between the speech device and the elevator.

Step 1104, receiving a speech content from a user and determining a user instruction according to the speech content.

Step 1105, sending the user instruction to the speech device cloud, so as to enable the speech device cloud to recognize the user instruction and control an elevator according to a recognition result.

Implementations of steps 1104-1105 are similar to that of steps 1001-1002 and are not repeated herein.

Step 1106, receiving an elevator control result sent by the speech device cloud, and broadcasting a notification message according to the elevator control result.

The speech device may also receive an elevator control result sent by the speech device cloud, and broadcast a notification message, for example, broadcast a message "the elevator has arrived, please go out" according to the elevator control result.

In an embodiment, when the speech device cloud controls the elevator via the elevator control cloud, the elevator may send an elevator state to the elevator control cloud, the elevator control cloud may determine elevator control information based on the elevator state and send the elevator control information to the speech device cloud, the speech device cloud sends an elevator control result to the speech device according to the elevator control information, and the speech device broadcasts a notification message according to the elevator control result, so as to enable the user to decide whether go out or not based on the notification message.

In another embodiment, when the speech device cloud directly controls the elevator, the elevator may send an elevator state to the speech device cloud, the speech device cloud may determine elevator control information based on the elevator state and send an elevator control result to the speech device according to the elevator control information, and the speech device broadcasts a notification message according to the elevator control result, so as to enable the user to decide whether go out or not based on the notification message.

The method provided by the present embodiment may be applied to a speech device, where a disposing position of the speech device includes any one of the following:

indoor, on a floor where the elevator is disposed, and inside the elevator.

Figure 12:
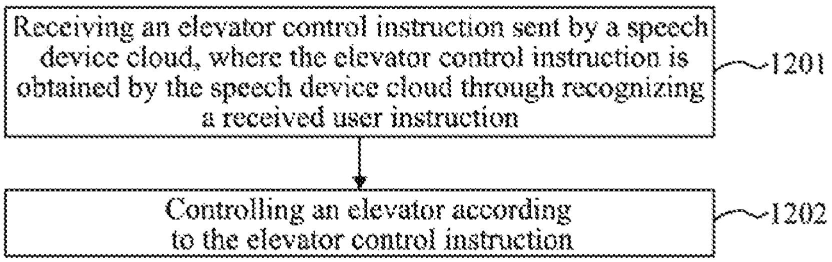
FIG. 12 is a flowchart of an elevator control method illustrated in the sixth exemplary embodiment of the present disclosure.

FIG. 12 is a flowchart of an elevator control method illustrated in the sixth exemplary embodiment of the present disclosure.

As shown in FIG. 12, an elevator control method provided by the present disclosure includes:

Step 1201, receiving an elevator control instruction sent by a speech device cloud, where the elevator control instruction is obtained by the speech device cloud through recognizing a received user instruction.

The method provided by the present embodiment may be performed by an electronic device with a computing capability, where the electronic device may be, for example, the speech device cloud 1A3 shown in FIG. 1A. The speech device cloud 1A3 may be a single electronic device, or may be composed of multiple electronic devices, for example, may be a distributed cluster server. The specific form thereof may be one or several computers Specifically, the user may speak a speech content, and a speech device may recognize the speech content and determine a user instruction. The speech device may send the recognized user instruction to the speech device cloud, and the speech device cloud may recognize the user instruction, specifically may recognize an intention of the instruction.

Further, the speech device cloud may send an elevator control instruction to an elevator control cloud according to a recognition result. A recognition algorithm may be preset in the speech device cloud to recognize the user instruction, and thus determine a user intention and obtain a recognition result.

Step 1202, controlling an elevator according to the elevator control instruction.

In practical applications, the elevator control cloud may control an elevator according to the received elevator control instruction.

The elevator control cloud may convert the received elevator control instruction into a self-owned instruction and send the self-owned instruction to an elevator, so as to enable the elevator to execute the instruction, thereby realizing a non-contact control of the elevator.

Specifically, the self-owned instruction may be an existing instruction configured to control the elevator for example, when the user presses a floor button 1, a control instruction generated or obtained by an elevator controller based on the pressing operation may be the self-owned instruction. For another example, when the user in a floor presses an up button, a control instruction generated or obtained by an elevator controller based on the operation may be the self-owned instruction. The reconstruction workload of the elevator side can be reduced by this way, thereby improving the efficiency of implementing the elevator control method.

Further, the elevation instruction includes information of the speech device, for example, may include a speech device identification. The elevator control cloud may also prestore a corresponding relationship between the speech device and the elevator, so as to determine an elevator to be controlled according to the abovementioned corresponding relationship and the information of the speech device after receiving the elevator control instruction, and then control the elevator to be controlled according to the elevator control instruction.

The method provided by the present embodiment is used to control the elevator, and the method is performed by a device provided with the method provided by the present embodiment, the device is generally implemented in a hardware and/or software manner.

The elevator control method provided by the present embodiment includes: receiving an elevator control instruction sent by a speech device cloud, where the elevator control instruction is obtained by the speech device cloud through recognizing a received user instruction; and controlling an elevator according to the elevator control instruction. The method provided by the present embodiment enables the user to control an elevator through a speech device without touching the elevator, thereby reducing potential safety risk caused by multiple people touching the elevator.

Figure 13:
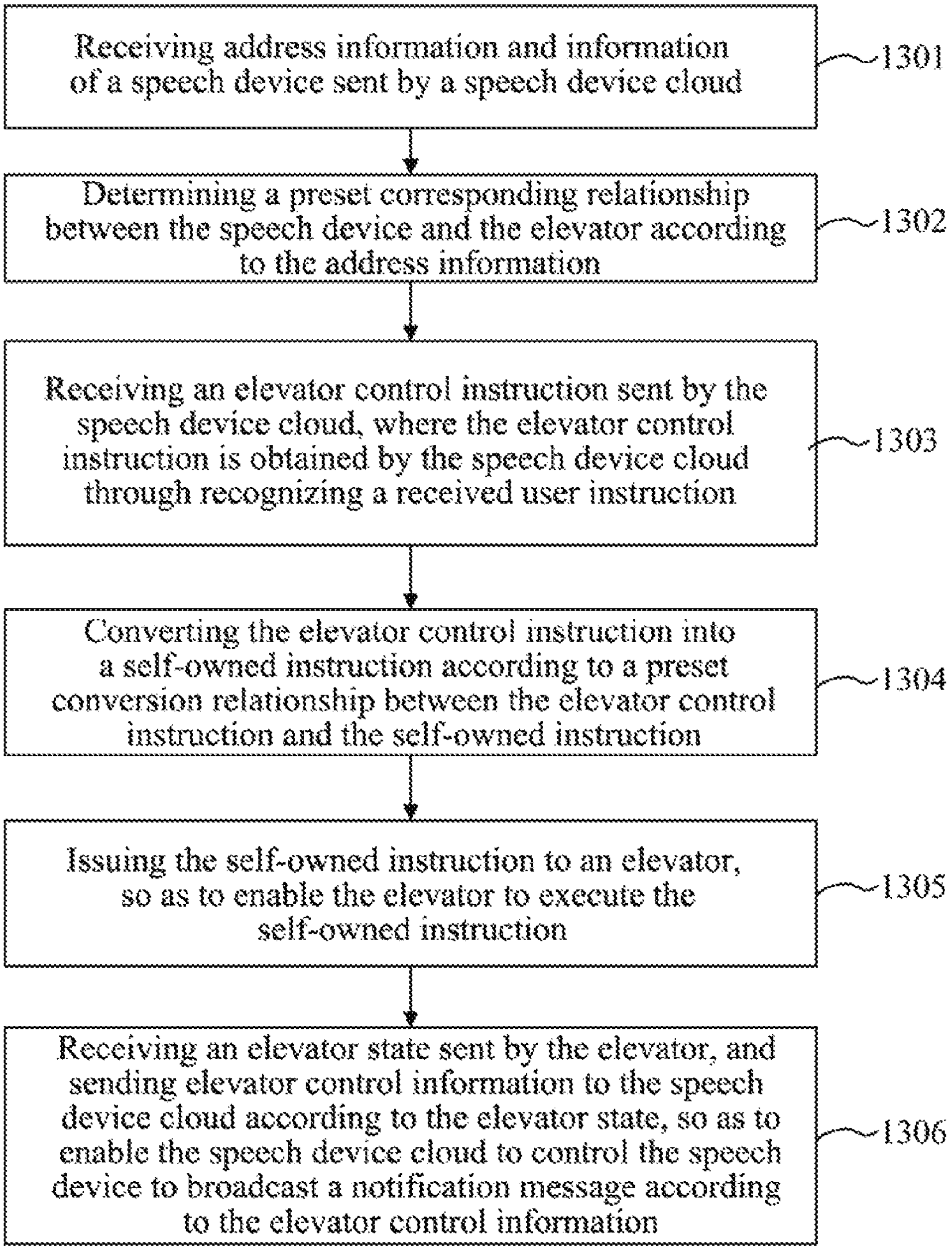
FIG. 13 is a flowchart of an elevator control method illustrated in the seventh exemplary embodiment of the present disclosure.

FIG. 13 is a flowchart of an elevator control method illustrated in the seventh exemplary embodiment of the present disclosure.

As shown in FIG. 13, the elevator control method provided by the present disclosure, includes:

Step 1301, receiving address information and information of a speech device sent by a speech device cloud.

The method provided by the present embodiment may be performed by an electronic device with a computing capability, where the electronic device may be, for example, the speech device cloud 1A3 shown in FIG. 1A. The speech device cloud 1A3 may be a single electronic device, or may be composed of multiple electronic devices, for example, may be a distributed cluster server. The specific form thereof may be one or several computers.

Specifically, in the method provided by the present embodiment, a speech device may be preset. For example, when the speech device is a user's device, then the user may set a home address, so as to enable the speech device to obtain address information. After that, the speech device may send the address information to the speech device cloud through a network, so as to enable the speech device cloud to receive the address information.

Further, after receiving the address information, information of the speech device which sends the address information and the address information may be sent together to an elevator control cloud, so as to enable the elevator control cloud to receive the address information and the information of the speech device.

In practical applications, the elevator corresponding to the speech device may be set directly, for example, when the speech device is disposed in a floor or in an elevator, a staff may directly set the elevator controlled by the speech device. The speech device may send this information to the speech device cloud, and then the speech device cloud send it to an elevator control cloud, and then the information is maintained by the elevator control cloud.

Step 1302, determining a preset corresponding relationship between the speech device and the elevator according to the address information.

In practical applications, after receiving the information of the speech device and its associated address information, the elevator control cloud may determine the elevator corresponding to the speech device, that is, an elevator that the speech device needs to control, according to the address information.

The elevator control cloud may also record the corresponding relationship between the speech device and the elevator, for example, the elevator control cloud may maintain a mapping table including information of each speech devices and the elevators it controls, such as a corresponding relationship between a speech device identification and an elevator identification.

Specifically, the elevator control cloud may also determine floor information of the speech device according to the received address information and record the corresponding relationship between the speech device and the floor. For example, a mapping table, in which a corresponding relationship between the speech device identification and the floor is recorded, may be maintained.

For example, address information of the speech device A is Adress1, and the elevator corresponding to the address is elevator 1, where the corresponding elevator refers to an elevator used at the address where the speech device A is located. The speech device cloud may send the address information of the speech device A, Adress1, to the elevator control cloud, and the elevator control cloud determines that the elevator corresponding to the speech device A is elevator 1, and stores a corresponding relationship between the speech device A and the elevator 1.

Step 1303, receiving an elevator control instruction sent by the speech device cloud, where the elevator control instruction is obtained by the speech device cloud through recognizing a received user instruction.

The implementation of step 1303 is similar to that of step 1201, and is not repeated herein.

Step 1304, converting the elevator control instruction into a self-owned instruction according to a preset conversion relationship between the elevator control instruction and the self-owned instruction.

Further, the conversion relationship between the elevator control instruction and the self-owned instruction may be preset in the elevator control cloud. The conversion relationship may be a corresponding relationship between one elevator control instruction and one self-owned instruction, or may be a corresponding relationship between an instruction unit and a self-owned instruction, where one or more instruction units may constitute one elevator control instruction.

In practical applications, when the conversion relationship is a corresponding relationship between an instruction unit and a self-owned instruction, the elevator control cloud may divide the elevator control instruction into multiple instruction units and then convert the elevator control instruction into the self-owned instruction according to the corresponding relationship between the instruction unit and the self-owned instruction, in that case, one elevator control instruction may be converted into multiple own instructions.

The self-owned instruction may be an existing instruction configured to control the elevator. For example, when the user presses a floor button 1, a control instruction generated or obtained by an elevator controller based on the pressing operation may be the self-owned instruction. For another example, when the user in a floor presses an up button, a control instruction generated or obtained by an elevator controller based on the operation may be the self-owned instruction. The reconstruction workload of the elevator side can be reduced by this way, thereby improving the efficiency of implementing the elevator control method.

Step 1305, issuing the self-owned instruction to an elevator, so as to enable the elevator to execute the self-owned instruction.

The elevator control cloud may send the self-owned instruction to an elevator, so as to enable the elevator to execute the self-owned instruction, thereby realizing a non-contact control of the elevator.

Specifically, the elevator control instruction may include information of the speech device, for example, may include a speech device identification. The elevator control cloud may determine an elevator to be controlled according to a corresponding relationship between the speech device and the elevator and the information of the speech device. The corresponding relationship may be a corresponding relationship determined by the elevator control cloud by using the address information and the information of the speech device received in step 1301. For example, when identification information of the speech device included in the elevator control instruction is A, the elevator control cloud may search a pre-determined corresponding relationship and determine that the elevator corresponding to the speech device A is an elevator 1, so as to determine the elevator 1 as the elevator to be controlled.

Further, the elevator control cloud may send the self-owned instruction to the determined elevator to be controlled, so as to enable the elevator to execute the self-owned instruction.

Step 1306, receiving an elevator state sent by the elevator, and sending elevator control information to the speech device cloud according to the elevator state, so as to enable the speech device cloud to control the speech device to broadcast a notification message according to the elevator control information.

In practical applications, the elevator may send an elevator state to the elevator control cloud, the elevator control cloud may determine an elevator control information based on the elevator state and send the elevator control information to the speech device cloud, the speech device cloud sends an elevator control result to the speech device according to the elevator control information, and the speech device broadcasts a notification message according to the elevator control result, so that the user can decide whether go out or not based on the notification message.

The information broadcasted by the speech device may be "the elevator has arrived, please go out".

Figure 14:
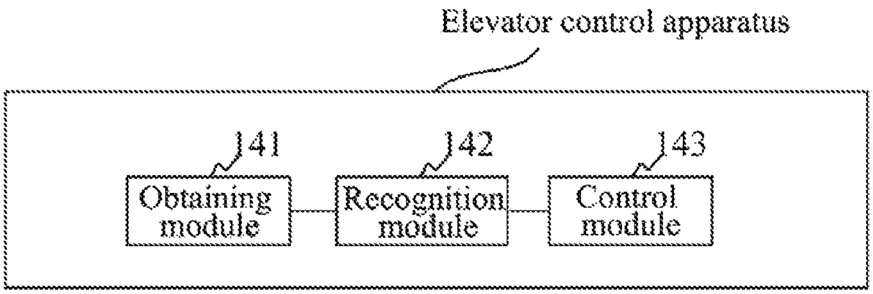
FIG. 14 is a structural diagram of an elevator control apparatus illustrated in the first exemplary embodiment of the present disclosure.

FIG. 14 is a structural diagram of an elevator control apparatus illustrated in the first exemplary embodiment of the present disclosure.

As shown in FIG. 14, the control apparatus provided by the present embodiment, includes:

- an obtaining module 141, configured to obtain a user instruction, where the user instruction is determined by a speech device based on a user speech content;
- a recognition module 142, configured to recognize the user instruction and convert the user instruction into an elevator control instruction; and
- a control module 143, configured to control an elevator via the elevator control instruction.

The elevator control apparatus provided by the present embodiment include an obtaining module, configured to obtain a user instruction, where the user instruction is determined by a speech device based on a user speech content; a recognition module, configured to recognize the user instruction and convert the user instruction into an elevator control instruction; and a control module, configured to control the elevator via the elevator control instruction. The elevator control apparatus provided by the present embodiment enables the user to control an elevator through a speech device without touching the elevator, thereby reducing the potential safety risk caused by multiple people touching the elevator.

The specific principle and implementation of the apparatus provided by the present embodiment are similar to that of the embodiment shown in FIG. 2, and are not repeated herein.

Figure 15:
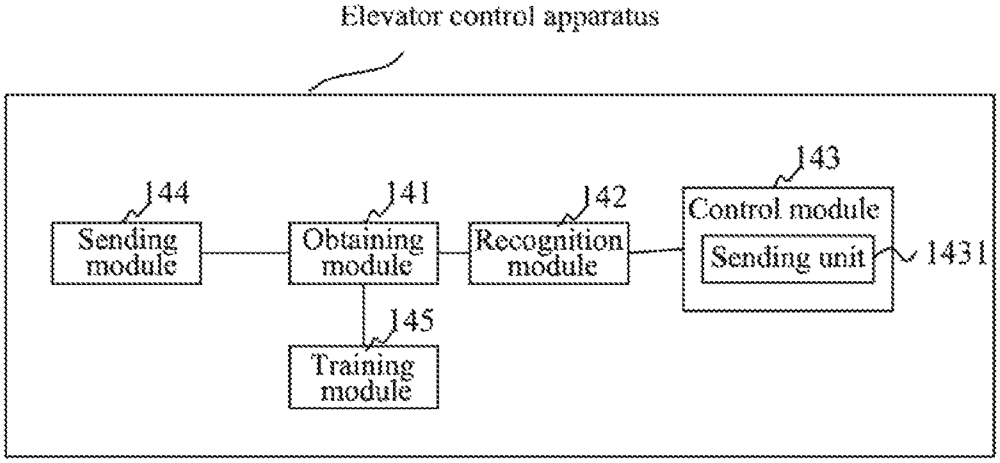
FIG. 15 is a structural diagram of an elevator control apparatus illustrated in the second exemplary embodiment of the present disclosure.

FIG. 15 is a structural diagram of an elevator control apparatus illustrated in the second exemplary embodiment of the present disclosure.

As shown in FIG. 15, on the basis of the embodiment shown in FIG. 14, in an implementation, the control module 143 includes a sending unit 1431, configure to:

send an elevator control instruction to an elevator control cloud, so as to enable the elevator control cloud to control the elevator according to the elevator control instruction.

In an implementation, the sending unit 1431 is specifically configured to:

send an elevator control instruction to the elevator, so as to enable the elevator to execute the elevator control instruction.

In an implementation, an elevator control protocol is preset;

and the recognition module 142 is specifically configured to:

convert the user instruction into the elevator control instruction based on the elevator control protocol.

In an implementation, when the user instruction is a reservation instruction, the recognition module 142 is further configured to:

recognize time information included in the reservation instruction; and determine timing of sending the elevator control instruction according to the time information.

In an implementation, the receiving module 141 is further configured to receive elevator control information;

and the control module 143 is further configured to:

send an elevator control result to the speech device according to the elevator control information, so as to enable the speech device to broadcast a notification message according to the elevator control result.

In an implementation, the obtaining module 141 is further configured to receive elevator control information; and the control module 143 is further configured to broadcast a notification message according to the elevator control information.

In an implementation, before obtaining an user instruction, the obtaining module 141 is further configured to:

receive address information sent by the speech device;

and the apparatus further includes a sending module 144, configured to:

send the address information and information of the speech device to the elevator control cloud, so as to enable the elevator control cloud to determine a corresponding relationship between the speech device and the elevator according to the address information.

In an implementation, the elevator control instruction includes the information of the speech device, so as to enable the elevator control cloud to determine the elevator to be controlled according to the corresponding relationship between the speech device and the elevator and the information of the speech device.

In an implementation, before receiving a user instruction, the obtaining module 141 is further configured to:

receive address information and/or elevator information; and determine a corresponding relationship between the speech device and the elevator according to the address information and/or the elevator information;

and the sending unit 1431 is specifically configured to:

determine an elevator to be controlled according to the corresponding relationship between the speech device and the elevator, and send the elevator control instruction to the elevator to be controlled.

In an implementation, a disposing position of the speech device include any one of the following:

indoor, in a floor where the elevator is disposed, and inside the elevator.

In an implementation, the apparatus further includes a training module 145, configured to:

preset an instruction dictionary for controlling an elevator, and train the speech device according to the instruction dictionary.

The specific principle and implementation of the apparatus provided by the present embodiment are similar to that of any one of the embodiments shown in FIG. 5 and FIG. 7, and are not repeated herein.

Figure 16:
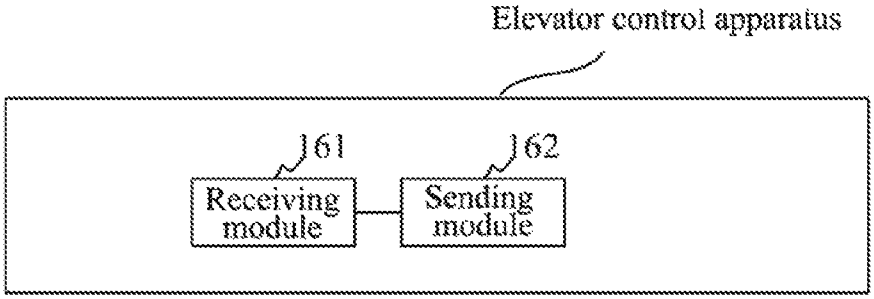
FIG. 16 is a structural diagram of an elevator control apparatus illustrated in the third exemplary embodiment of the present disclosure.

FIG. 16 is a structural diagram of an elevator control apparatus structural diagram illustrated in the third exemplary embodiment of the present disclosure.

As shown in FIG. 16, the elevator control apparatus provided by the present embodiment, includes:

a receiving module 161, configured to receive a speech content from a user, and determine a user instruction according to the speech content; and a sending module 162, configured to send the user instruction to a speech device cloud, so as to enable the speech device cloud to recognize the user instruction and control an elevator according to a recognition result.

The elevator control apparatus provided by the present embodiment includes a receiving module, configured to receive a speech content from a user, and determine a user instruction according to the speech content; and a sending module, configured to send the user instruction to a speech device cloud, so as to enable the speech device cloud to recognize the user instruction and control an elevator according to a recognition result. The elevator control apparatus provided by the present embodiment enables the user to control an elevator through a speech device without touching the elevator, thereby reducing potential safety risk caused by multiple people touching the elevator.

The specific principle and implementation of the apparatus provided by the present embodiment are similar to that of the embodiment shown in FIG. 10, and are not repeated herein.

Figure 17:
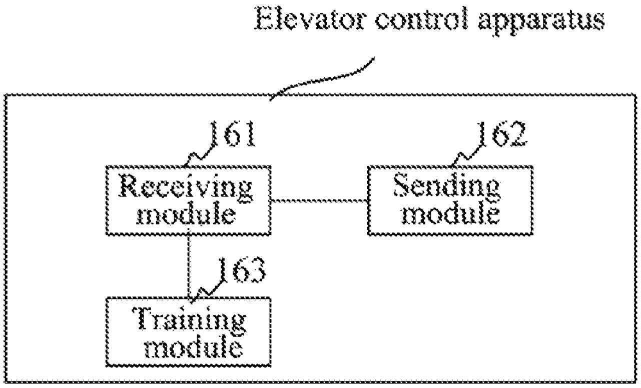
FIG. 17 is a structural diagram of an elevator control apparatus illustrated in the fourth exemplary embodiment of the present disclosure.

FIG. 17 is a structural diagram of an elevator control apparatus illustrated in the fourth exemplary embodiment of the present disclosure.

As shown in FIG. 17, on the basis of the embodiment shown in FIG. 16, in an implementation, the elevator control apparatus provided by the present embodiment further includes a training module 163, configured to:

preset an instruction dictionary for controlling an elevator, and perform a training according to the instruction dictionary.

In an implementation, the receiving module 161 is further configured to:

receive an elevator control result, and broadcast a notification message according to the elevator control result.

In an implementation, before receiving the speech content from the user, the receiving module 161 is further configured to:

receive a configuration instruction including address information;

and the sending module 162 is further configured to send the address information to the speech device cloud, so as to enable the speech device cloud to store a corresponding relationship between the speech device and the address information, or, enable the speech device cloud to send the address information and the information of the speech device to the elevator control cloud so as to enable the elevator control cloud to store the corresponding relationship between the speech device and the address information.

In an implementation, the elevator control apparatus is applied to a speech device, and a disposing position of the speech device includes any one of the following:

indoor, in a floor where the elevator is disposed, and inside the elevator.

The specific principle and implementation of the apparatus provided by the present embodiment are similar to that of the embodiment shown in FIG. 11, and are not repeated herein.

Figure 18:
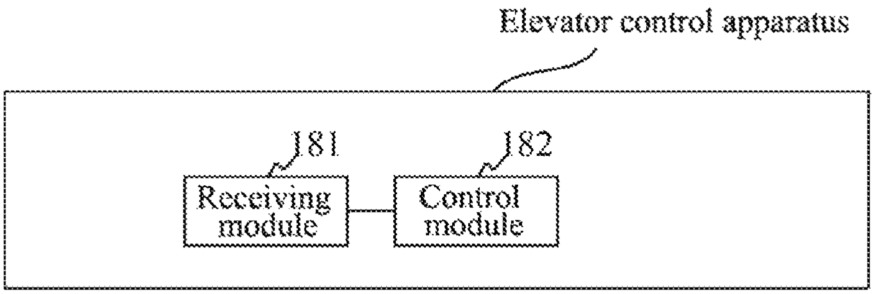
FIG. 18 is a structural diagram of an elevator control apparatus illustrated in the fifth exemplary embodiment of the present disclosure.

FIG. 18 is a structural diagram of an elevator control apparatus illustrated in the fifth exemplary embodiment of the present disclosure.

As shown in FIG. 18, the elevator control apparatus provided by the present disclosure, includes:

a receiving module 181, configured to receive an elevator control instruction sent by a speech device cloud, where the elevator control instruction is obtained by the speech device cloud through recognizing a received user instruction; and a control module 182, configured to control an elevator according to the elevator control instruction.

The elevator control apparatus provided by the present embodiment includes a receiving module, configured to receive an elevator control instruction sent by a speech device cloud, where the elevator control instruction is obtained by the speech device cloud through recognizing a received user instruction; and a control module, configured to control an elevator according to the elevator control instruction. The elevator control apparatus provided by the present embodiment enables the user to control an elevator through a speech device without touching the elevator, thereby reducing the potential safety risk caused by multiple people touching the elevator.

The specific principle and implementation of the apparatus provided by the embodiment are similar to that of the embodiment shown in FIG. 12, and are not repeated herein.

Figure 19:
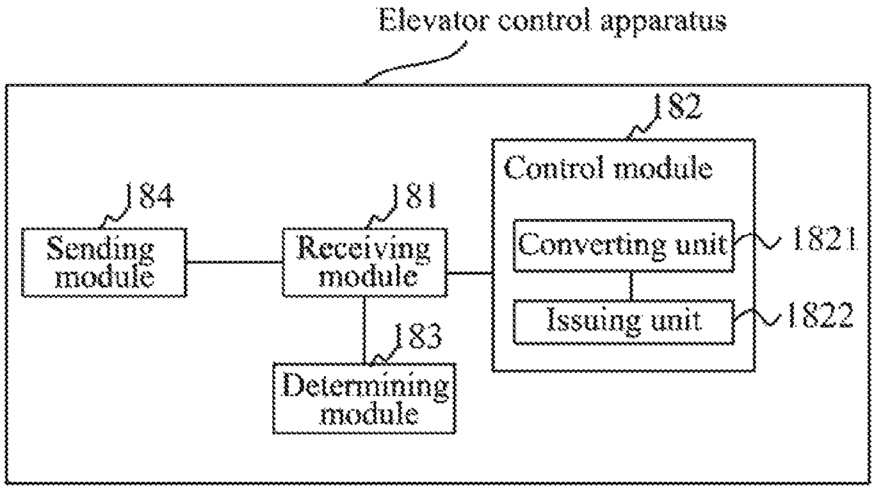
FIG. 19 is a structural diagram of an elevator control apparatus illustrated in the sixth exemplary embodiment of the present disclosure.

FIG. 19 is a structural diagram of an elevator control apparatus illustrated in the sixth exemplary embodiment of the present disclosure.

As shown in FIG. 19, on the basis of the embodiment shown in FIG. 18, in the elevator control apparatus provided by the present embodiment, in an implementation, the control module 182 includes:

a conversion unit 1821, configured to convert the elevator control instruction into a self-owned instruction according to a preset conversion relationship between the elevator control instruction and the self-owned instruction; and an issuing unit 1822, configured to issue the self-owned instruction to the elevator, so as to enable the elevator to execute the self-owned instruction.

In an implementation, the elevator control instruction includes information of a speech device;

and the issuing unit 1822 is specifically configured to:

determine an elevator to be controlled according to a corresponding relationship between the preset speech device and the elevator and the information of the speech device; and issuing the self-owned instruction to the elevator to be controlled.

In an implementation, before receiving the elevator control instruction sent by the speech device cloud, the receiving module 181 is further configured to:

receive the address information and the information of the speech device sent by the speech device cloud;

and the apparatus further includes a determining module 183, configured to:

determine the preset corresponding relationship between the speech device and the elevator according to the address information.

In an implementation, the receiving module 181 is also further configured to receive an elevator state sent by the elevator;

and the apparatus further includes a sending module 184, configured to send an elevator control information to the speech device cloud according to the elevator state, so as to enable the speech device cloud to control the speech device to broadcast a notification message according the elevator control information.

The specific principle and implementation of the apparatus provided by the present embodiment are similar to that of the embodiment shown in FIG. 13, and are not repeated herein.

According to the embodiments provided by the present disclosure, the present disclosure further provides an electronic device and a readable storage medium.

Figure 20:
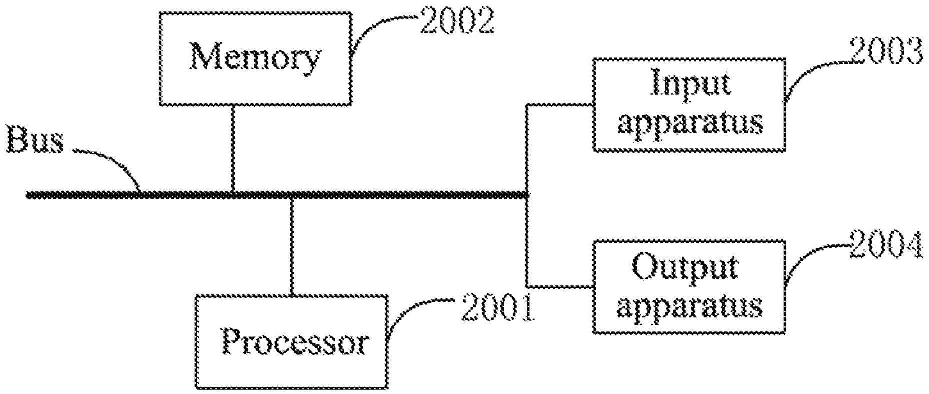
FIG. 20 is a structural diagram of an electronic device illustrated in an exemplary embodiment of the present disclosure.

As shown in FIG. 20, it is a block diagram of an electronic device according to embodiments of the present disclosure. The electronic device is aimed to represent various forms of digital computers, such as laptop, desktop computer, workbench, personal digital assistant, server, blade server, large-scale computer and other suitable computer. The digital device may also represent various forms of mobile apparatus, such as personal digital assistant, cellular phone, smart phone, wearable device and other similar computing apparatus. The components, their connections and relations, and their functions shown herein serves no more than examples, and are not intended to limit implementations of the disclosure described and/or required herein.

As shown in FIG. 20, the electronic device includes: one or more processor 2001, a memory 2002, and interfaces configured to connect components, which include a high-speed interface and a low-speed interface. The components are connected with each other by using different buses, and may be disposed on a motherboard or in other ways as needed. The processor may process instructions executed in the electronic device, including instructions stored in or on the memory for displaying graphical information of GUI on an external input/output device (such as, a display device coupled to an interface). In other embodiments, if needed, multiple processors and/or multiple buses may be utilized together with multiple memories. Similarly, multiple electronic devices may be connected, and each device provides a part of necessary operations (for example, as a server array, a group of blades servers, or multi-processor system). A processor 2001 is taken as an example in FIG. 20.

The memory 2002 is the non-instantaneous computer readable medium provided by the present disclosure. An instruction executable by at least one processor is stored in the memory, so as to enable the at least one processor to execute any one of the elevator control methods provided by the present disclosure. The non-instantaneous computer readable memory medium of the present disclosure stores a computer instruction, the computer instruction is used to enable a computer to execute the elevator control methods provided by the present disclosure.

The memory 2002, as a non-instantaneous computer readable memory medium, may be used to store non-transitory software programs, non-instantaneous computer executable programs and modules, such as program instructions/modules (for example, the receiving module 141, the recognition module 142, the control module 143 shown in FIG. 14, and for another example, the receiving module 161 and the sending module 162 shown in FIG. 16, and for another example, the receiving module 181 and the control module 182 shown in FIG. 18) corresponding to the elevator control method in the embodiments of the present disclosure. The processor 2001 executes various functional applications and data processing of a server, i.e. implements the elevator control methods in the abovementioned method embodiment, by running non-instantaneous software programs, instructions and modules stored in the memory 2002.

The memory 2002 may include a program storage area and a data storage area, where, the program storage area may store an operation system and at least one application program required by at least one function; the data storage area may store data created according to the use of the electronic device and the like. In addition, the memory 2002 may include a high-speed random memory, and may also include a non-instantaneous memory, such as at least one disk storage device, a flash memory device, or other non-instantaneous solid memory devices. In some embodiments, the memory 2002 may include a memory that is remotely configured corresponding to the processor 2001, and the memory may be connected to the electronic device through a network. Examples of the abovementioned network include, but not limited to the internet, intranet, local network, mobile communication network and a combination thereof.

The electronic device may further include: an input apparatus 2003 and an output apparatus 2004. The processor 2002, the input apparatus 2003 and the output apparatus 2004 may be connected by a bus or in other way, a connection via a bus is taken as an example in the FIG. 20.

The input apparatus 2003 may receive input numbers or character information, and generate key signal input related to a user configuration and a function control of the electronic device, which may be an input apparatus, such as a touch screen, a keypad, a mouse, a trackpad, a touchpad, a pointing stick, one or more mouse buttons, a trackball or a joystick. The output apparatus 2004 may include a display device, an auxiliary lighting apparatus (e.g., LED) and a tactile feedback device (e.g. vibration motor) and the like. The display device may include, but is not limit to, a liquid crystal display (LCD), a light emitting diode (LED) display and a plasma display. In some embodiments, the display device may be a touch screen.

In an implementation, the present embodiment also provides an elevator control system, including a speech device, a speech device cloud, an elevator control cloud and an elevator; wherein, the speech device is connected with the speech device cloud, the speech device cloud is connect with the elevator control cloud, and the elevator control cloud is connected with the elevator;

the speech device is configured to execute the elevator control method shown in FIG. 10 or FIG. 11;

the speech device cloud is configured to execute the elevator control method shown in any one of FIG. 2, FIG. 5 and FIG. 7; and the elevator control cloud is configured to execute the elevator control method shown in FIG. 12 or FIG. 13, so as to realize a control of the elevator.

In an implementation, the present embodiment also provides another elevator control system, including a speech device, a speech device cloud and an elevator; wherein, the speech device is connected to the speech device cloud, the speech device cloud is connected to the elevator;

the speech device is configured to execute the elevator control method shown in FIG. 10 or FIG. 11; and the speech device cloud is configured to execute elevator control method shown in any one of FIG. 2, FIG. 5 and FIG. 7.

Various implementations of the systems and the technologies described herein may be implemented in a digital electronic circuit system, an integrated circuit system, an exclusively use ASIC (exclusively used integrated circuit), a computer hardware, a firmware, a software and/or a combination thereof. The various implementations may include: implemented in one or more computer programs, where the one or more computer programs may be executed and/or explained at a programmable system including at least one programmable processor, the programmable processor may be a dedicated or universal programmable processor and may receive data and instructions from a storage system, at least one input apparatus and at least one output apparatus, and transmit the data and instructions to the storage system, the at least one input apparatus and the at least one output apparatus.

These computer programs (also referred to as programs, software, software applications, or codes) include machine instructions of the programmable processor, and may implement the computer programs by utilizing a high-level process and/or an object-oriented programming languages, and/or assembly/machine language. As used herein, terms "machine readable medium" and "computer readable medium" refer to any computer program product, device, and/or apparatus (e.g. disk, magnetic disk, optical disk, memory, programmable logic device (PLD)) configured to provide machine instructions and/or data to the programmable processor, include a machine readable medium that receives a machine instruction as a machine readable signal. A term "machine readable signal" refers to any signal configured to provide machine instructions and/or data to the programmable processor.

In order to provide an interaction with the user, the systems and the technologies described herein may be implemented on a computer, where the computer includes: a display apparatus (e.g. CRT (cathode ray tube) or LCD (liquid crystal display) monitor) configured to display information to the user; and a keyboard and a pointing apparatus (e.g. a mouse or a trackball), the user may provide input to the computer through the keyboard and the pointing apparatus. Other types of devices may also be used to provide the interaction with the user; for example, a feedback provided to the user may be a sensory feedback in any form (e.g. visual feedback, auditory feedback, or tactile feedback); and may receive the input from the user in any form (including acoustic input, speech input or tactile input).

The systems and the technologies described herein may be implemented in a computing system including a back-end component (e.g. as a data server), or a computing system including a middleware component (e.g. an application server), or a computing system including a front-end component (e.g. a user computer having a graphical user interface or a web browser, the user may interact with implementations of the systems and technologies described herein through the graphical user interface or the web browser), or a computing system including any combination of the back-end component, the middleware component and the front-end component. Components of the system may be connected with each other through a digital data communication in any form or with any medium (e.g. a communication network). Examples of communication network includes: a local area network (LAN), a wide area network (WAN) and the internet.

The computing system may include a client and a server. The client and the server are generally far away from each other and usually interact through a communication network. A relationship between the client and the server is generated by computer programs running on corresponding computers and having a client-server relationship with each other.

It should be understood that the above-described flow path in various form may be used rearranging, adding or deleting steps. For example, steps recorded in the present disclosure may be executed concurrently, or implemented in sequence, or implemented in different order, as long as the expected result of the technical solution disclosed in the present disclosure can be achieved, to which no limitation is defined herein.

The abovementioned specific embodiments do not limit the protection scope of the present disclosure. Those skilled in the art should understand that various modifications, combinations, sub-combinations and substitutions may be made according to design requirements and other factors. Any modifications, equivalent substitutions and improvements made within the scope of spirit and principle of the present disclosure should be included in the protective scope of the present disclosure.

What is claimed is:

1. An elevator control method, comprising:

obtaining a user instruction, wherein the user instruction is determined by a speech device based on a speech content from a user;

recognizing the user instruction and converting the user instruction into an elevator control instruction; and controlling an elevator via the elevator control instruction;

wherein the controlling the elevator via the elevator control instruction, comprises:

sending the elevator control instruction to an elevator control cloud, so as to enable the elevator control cloud to control the elevator according to the elevator control instruction;

wherein before the obtaining a user instruction, further comprising:

receiving address information of the speech device sent by the speech device, and sending the address information of the speech device and information of the speech device to the elevator control cloud so as to enable the elevator control cloud to determine a corresponding relationship between the speech device and the elevator according to the address information of the speech device and the information of the speech device.

2. The method according to claim 1, wherein an elevator control protocol is preset; and wherein the converting the user instruction into an elevator control instruction, comprises:

converting the user instruction into the elevator control instruction based on the preset elevator control protocol.

3. The method according to claim 2, wherein the user instruction is determined by converting the speech content from the user into a text content;

wherein converting the user instruction into the elevator control instruction based on the preset elevator control protocol comprises:

recognizing a user intention from the user instruction, and converting, based on the preset elevator control protocol, the user instruction into the elevator control instruction according to the user intention.

4. The method according to claim 1, wherein when the user instruction is a reservation instruction, the method further comprises:

recognizing time information included in the reservation instruction; and determining timing of sending the elevator control instruction according to the time information.

5. The method according to claim 1, further comprising:

receiving elevator control information, and sending an elevator control result to the speech device according to the elevator control information, so as to enable the speech device to broadcast a notification message according to the elevator control result.

6. The method according to claim 1, wherein the elevator control instruction includes the information of the speech device, so as to enable the elevator control cloud to determine an elevator to be controlled according to the corresponding relationship between the speech device and the elevator and the information of the speech device.

7. The method according to claim 1, wherein a disposing position of the speech device comprises any one of the following:

indoor, in a floor where the elevator is disposed, and inside the elevator.

8. The method according to claim 1, comprising:

presetting an instruction dictionary for controlling elevator, and training the speech device according to the instruction dictionary.

9. An electronic device, comprising:

at least one processor; and a memory communicated with the at least one processor; wherein, the memory stores an instruction executable by the at least one processor, the instruction is executed by the at least one processor to enable the at least one processor to execute the method according to claim 1.

10. A non-transitory computer readable storage medium storing a computer instruction, wherein, the computer instruction is configured to enable a computer to execute the method according to claim 1.

11. The method according to claim 1, wherein the information of the speech device comprises identification of the speech device and/or an account for logging into the speech device.

12. An elevator control method, comprising:

receiving a speech content from a user, and determining a user instruction according to the speech content; and sending the user instruction to a speech device cloud, so as to enable the speech device cloud to recognize the user instruction and control an elevator according to a recognition result;

wherein before the receiving a speech content from a user, further comprising:

receiving a configuration instruction comprising address information of a speech device;

sending the address information to the speech device cloud so as to enable the speech device cloud to send the address information and information of the speech device to an elevator control cloud to enable the elevator control cloud to determine a corresponding relationship between the speech device and the elevator according to the address information of the speech device and the information of the speech device.

13. The method according to claim 12, further comprising:

receiving elevator control information from the elevator, and broadcasting a notification message according to the elevator control information.

14. An elevator control method, comprising:

receiving an elevator control instruction sent by a speech device cloud, wherein the elevator control instruction is obtained by the speech device cloud through recognizing a received user instruction; and controlling an elevator according to the elevator control instruction;

wherein before the receiving an elevator control instruction sent by a speech device cloud, further comprising:

receiving address information of a speech device and information of the speech device sent by the speech device cloud; and determining a corresponding relationship between the speech device and the elevator according to the address information of the speech device and the information of the speech device.

15. The method according to claim 14, wherein the controlling an elevator according to the elevator control instruction, comprises:

converting the elevator control instruction into a self-owned instruction according to a conversion relationship between a preset elevator control instruction and the self-owned instruction; and issuing the self-owned instruction to the elevator, so as to enable the elevator to execute the self-owned instruction.

16. The method according to claim 15, wherein the elevator control instruction comprises the information of the speech device; and wherein the sending the self-owned instruction to the elevator, comprises:

determining an elevator to be controlled according to the corresponding relationship between the speech device and the elevator and the information of the speech device; and issuing the self-owned instruction to the elevator to be controlled.

17. An elevator control system, comprising a speech device, a speech device cloud, an elevator control cloud and an elevator; wherein, the speech device is connected with the speech device cloud, the speech device cloud is connected with the elevator control cloud, and the elevator control cloud is connected with the elevator;

the speech device is configured to execute following steps:

receiving a speech content from a user, and determining a user instruction according to the speech content; and sending the user instruction to a speech device cloud, so as to enable the speech device cloud to recognize the user instruction and control a elevator according to a recognition result;

wherein the speech device is further configured to execute the following steps before receiving the speech content from the user:

receiving a configuration instruction comprising address information of the speech device;

sending the address information to the speech device cloud;

the speech device cloud is configured to execute following steps:

obtaining the user instruction from the speech device;

recognizing the user instruction and converting the user instruction into an elevator control instruction; and sending the elevator control instruction to the elevator control cloud;

wherein the speech device cloud is further configured to execute the following steps before obtaining the user instruction:

receiving the address information of the speech device sent by the speech device, and sending the address information of the speech device and information of the speech device to the elevator control cloud; and the elevator control cloud is configured to execute the method according to claim 14, to control the elevator.

* * * * *